(12) United States Patent
Kudo

(10) Patent No.: US 12,221,107 B2
(45) Date of Patent: Feb. 11, 2025

(54) VEHICLE DRIVE ASSIST APPARATUS

(71) Applicant: SUBARU CORPORATION, Tokyo (JP)

(72) Inventor: Shinya Kudo, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 532 days.

(21) Appl. No.: 17/508,129

(22) Filed: Oct. 22, 2021

(65) Prior Publication Data

US 2022/0144275 A1   May 12, 2022

(30) Foreign Application Priority Data

Nov. 6, 2020 (JP) ................... 2020-185984

(51) Int. Cl.
*B60W 30/18* (2012.01)
*B60Q 1/50* (2006.01)
(Continued)

(52) U.S. Cl.
CPC ....... *B60W 30/18159* (2020.02); *B60Q 1/525* (2013.01); *B60W 30/09* (2013.01);
(Continued)

(58) Field of Classification Search
CPC ........... B60W 30/18159; B60W 30/09; B60W 30/0956; B60W 40/04; B60Q 1/525;
(Continued)

(56) References Cited

U.S. PATENT DOCUMENTS 6,097,156 A * 8/2000 Diep ..................... B60Q 1/442
307/10.8
8,950,970 B2 * 2/2015 Gingrich, Sr. ............ E01C 1/04
404/1
(Continued)

FOREIGN PATENT DOCUMENTS

DE  102018124161 A1 * 4/2020 ............ B60W 30/09
JP  2012232685 A * 11/2012
(Continued)

OTHER PUBLICATIONS

DE102018124161A1 machine translation (Year: 2020).*
(Continued)

*Primary Examiner* — Fadey S. Jabr
*Assistant Examiner* — Mark Robert Heim
(74) *Attorney, Agent, or Firm* — TROUTMAN PEPPER LOCKE LLP

(57) ABSTRACT

A vehicle drive assist apparatus includes a surrounding-condition-information acquiring unit that acquires surrounding condition information, a vehicle-state-information acquiring unit that acquires vehicle state information, a light-distribution control processor that executes light distribution control, a traveling control processor that executes traveling control in accordance with traffic lane designation, a DDI detector that detects a DDI in a front region based on the surrounding condition information and determines whether the vehicle is entering or exiting from the DDI based on the surrounding condition information and the vehicle state information, and a control switch. When the vehicle entering the DDI is detected, the control switch switches the traveling control and the light distribution control from standard traveling control to non-standard traveling control. When the vehicle exiting from the DDI is detected, the control switch switches the traveling control (Continued)

and the light distribution control from the non-standard traveling control to the standard traveling control.

6 Claims, 7 Drawing Sheets

(51) Int. Cl.
*B60W 30/09* (2012.01)
*B60W 30/095* (2012.01)
*B60W 40/04* (2006.01)
*G06V 20/58* (2022.01)

(52) U.S. Cl.
CPC ........ *B60W 30/0956* (2013.01); *B60W 40/04* (2013.01); *G06V 20/58* (2022.01); *G06V 20/584* (2022.01); *B60Q 2300/42* (2013.01); *B60Q 2300/45* (2013.01)

(58) Field of Classification Search
CPC ............ B60Q 2300/42; B60Q 2300/45; B60Q 2300/32; B60Q 1/085; B60Q 1/143; B60Q 1/1423; B60Q 1/507; B60Q 2300/05–056; B60Q 2800/10; B60Q 2300/331; G06V 20/58; G06V 20/584; G06V 20/588
See application file for complete search history.

(56) References Cited

U.S. PATENT DOCUMENTS

| | | | | |
|---|---|---|---|---|
| 9,586,515 | B2* | 3/2017 | Foltin | G06V 20/584 |
| 9,731,645 | B1* | 8/2017 | Taleb-Bendiab | H05B 47/19 |
| 9,896,022 | B1* | 2/2018 | Pertsel | B60Q 1/122 |
| 10,948,151 | B1* | 3/2021 | Brown | F21S 41/663 |
| 11,007,926 | B1* | 5/2021 | Smart | H05B 45/335 |
| 11,498,584 | B2* | 11/2022 | Oyama | B60W 30/18154 |
| 2002/0080618 | A1* | 6/2002 | Kobayashi | B60Q 1/085 |
| | | | | 362/465 |
| 2005/0090950 | A1* | 4/2005 | Sawamoto | G08G 1/166 |
| | | | | 701/28 |
| 2012/0027255 | A1* | 2/2012 | Endo | G06V 20/588 |
| | | | | 382/103 |
| 2012/0032594 | A1* | 2/2012 | Hagner | B60Q 1/085 |
| | | | | 315/82 |
| 2013/0011190 | A1* | 1/2013 | Gingrich, Sr. | E01C 1/04 |
| | | | | 404/1 |
| 2013/0175926 | A1* | 7/2013 | Katsuno | B60Q 1/143 |
| | | | | 315/82 |
| 2014/0029281 | A1* | 1/2014 | Suckling | F21V 13/14 |
| | | | | 362/510 |
| 2015/0003087 | A1* | 1/2015 | Futamura | B60Q 9/008 |
| | | | | 362/466 |
| 2015/0025770 | A1* | 1/2015 | Blake | B60W 30/14 |
| | | | | 701/93 |
| 2017/0154531 | A1* | 6/2017 | Funabashi | G08G 1/166 |
| 2017/0368981 | A1* | 12/2017 | Liken | G06V 20/584 |
| 2018/0015868 | A1* | 1/2018 | Dudar | B60Q 1/12 |
| 2018/0165959 | A1 | 6/2018 | Leem et al. | |
| 2018/0357903 | A1* | 12/2018 | Fukunaga | G06V 20/588 |
| 2019/0176684 | A1* | 6/2019 | Zych | G06V 20/58 |
| 2020/0005645 | A1* | 1/2020 | Wray | G08G 1/166 |
| 2020/0066161 | A1* | 2/2020 | Hasegawa | G08G 1/167 |
| 2020/0269746 | A1* | 8/2020 | Raichelgauz | B60Q 1/085 |
| 2020/0331467 | A1* | 10/2020 | Ohmura | B60W 30/09 |
| 2020/0408539 | A1* | 12/2020 | Komaru | G01C 21/343 |
| 2021/0122373 | A1* | 4/2021 | Dax | B60W 30/18159 |
| 2021/0224429 | A1* | 7/2021 | Singh | E01C 1/02 |
| 2021/0323547 | A1* | 10/2021 | Kozono | B60W 30/09 |
| 2022/0034470 | A1* | 2/2022 | Chen | F21S 41/27 |
| 2022/0144274 | A1* | 5/2022 | Kudo | B60W 30/18159 |
| 2022/0289102 | A1* | 9/2022 | Gut | B60Q 1/085 |
| 2023/0140569 | A1* | 5/2023 | Foster | B60W 30/12 |
| | | | | 701/400 |

FOREIGN PATENT DOCUMENTS

| | | |
|---|---|---|
| JP | 2017-177941 A | 10/2017 |
| JP | 2018-206313 A | 12/2018 |

OTHER PUBLICATIONS

JP2012232685A machine translation (Year: 2012).*
Japanese Office Action issued in corresponding JP Application No. 2020-185984, dated Mar. 19, 2024, related to U.S. Appl. No. 17/508,129.

* cited by examiner

VEHICLE DRIVE ASSIST APPARATUS

CROSS-REFERENCE TO RELATED APPLICATION

The present application claims priority from Japanese Patent Application No. 2020-185984 filed on Nov. 6, 2020, the entire contents of which are hereby incorporated by reference.

BACKGROUND

The technology relates to a vehicle drive assist apparatus that performs drive assist control to assist a driver in driving a vehicle on the basis of road conditions or oncoming vehicle information acquired by sensing devices such as a camera and retrieved from map information while the vehicle is traveling.

Recent years have seen development in an automatic driving control technology that enables automatic traveling control, such as automatic brake control or automatic steering control, for avoiding contact of an own vehicle (e.g., an automobile) with mobile objects. While the own vehicle is traveling on a road under the automatic driving control, the circumstances of a front region and a surrounding region of the own vehicle are recognized and imaged by a sensing device such as a camera to detect mobile objects present around the own vehicle. Examples of the mobile objects include vehicles other than the own vehicle, such as preceding vehicles and oncoming vehicles, and bicycles and pedestrians moving around the own vehicle.

Various vehicle drive assist apparatuses using this automatic driving control technology have been put into practical use. For example, Japanese Unexamined Patent Application Publication (JP-A) No. 2018-206313 discloses a vehicle drive assist apparatus that performs drive assist control to assist a driver in driving a vehicle by issuing a warning to the driver and executing brake control and steering control when contact is estimated between the vehicle and a detected mobile object.

An existing drive assist apparatus detects an oncoming vehicle by recognizing an own-vehicle lane, an oncoming-vehicle lane, and a mobile object approaching the own vehicle, for example. In this case, while the own vehicle is traveling on a left lane of a left-hand traffic road, the drive assist apparatus identifies a mobile object detected in a region lying in right front of the own vehicle when viewed in the width direction of the own vehicle as an oncoming vehicle. In contrast, while the own vehicle is traveling on a right lane of a right-hand traffic road, the drive assist apparatus identifies a mobile object detected in a region in left front of the own vehicle when viewed in the width direction of the own vehicle as an oncoming vehicle.

For the existing drive assist apparatus, various techniques for distributing illumination light of the headlight depending on a surrounding condition during night drive have been proposed and put into practical use. JP-A No. 2017-177941, for example, discloses a high-beam assist (HBA) system and an adaptive driving beam (ADB) system. The HBA system detects a light beam emitted from the headlight of an oncoming vehicle and automatically makes a switch between a high-beam mode and a low-beam mode when the vehicle approaches a preceding vehicle. The ADB system controls the light distribution depending on a traveling condition.

Meanwhile, lane changing or merging into another vehicle lane is often performed at a certain point, such as a highway interchange, on a road on which automobiles or other vehicles are traveling. Thus, traffic congestion, accidental contact, or the like are likely to be caused particularly in heavy traffic roads.

To address such a concern, various new designs of an interchange, such as a diverging diamond interchange (hereinafter simply referred to as DDI), have been proposed. These new interchange designs have been already put into practical use and becoming widespread particularly in the United States of America.

The interchange called DDI has a predetermined region in which the relative positional relationship is reversed in a lateral direction between an own-vehicle lane on which an own vehicle is traveling and an oncoming-vehicle lane on which other vehicles are traveling in the opposite direction to the own vehicle. The predetermined region may be a part of a general road area including an entrance and an exit of a highway.

For example, in the case of a right-hand traffic general road, the lane on the right side when viewed from the own vehicle is basically regarded as the own-vehicle lane, and the lane on the left side when viewed from the own vehicle is basically regarded as the oncoming-vehicle lane.

In contrast, the DDI has an irregular structure: The DDI includes a pair of intersections with traffic lights provided in part of an interchange region (part of the general road including an entrance and an exit of the highway). At these intersections, the own-vehicle lane intersects with the oncoming-vehicle lane. The relative positional relationship between the own-vehicle lane and the oncoming-lane is reversed in the lateral direction within the general road area defined between the paired intersections.

This structure of the DDI ensures a more efficient traffic flow and high safety while mitigating traffic congestion. The simple structure of the DDI also contributes to reduce the construction costs.

SUMMARY

An aspect of the technology provides a vehicle drive assist apparatus to be applied to a vehicle. The vehicle drive assist apparatus includes a surrounding-condition-information acquiring unit, a vehicle-state-information acquiring unit, a light-distribution control processor, a traveling control processor, a DDI detector, and a control switch. The surrounding-condition-information acquiring unit is configured to recognize a surrounding condition around the vehicle to acquire surrounding condition information. The vehicle-state-information acquiring unit is configured to recognize an operational state of the vehicle to acquire vehicle state information. The light-distribution control processor is configured to execute light distribution control to control the distribution of illumination light to the region in front of the vehicle by controlling an illumination device of the vehicle. The traveling control processor is configured to execute traveling control of the vehicle in accordance with traffic lane designation. The DDI detector is configured to detect a diverging diamond interchange (DDI) in a region in front of the vehicle on the basis of the surrounding condition information and make a DDI determination as to whether the vehicle is entering the DDI or exiting from the DDI on the basis of the surrounding condition information and the vehicle state information. The control switch is configured to switch the traveling control executed by the traveling control processor on the basis of the result of the DDI determination made by the DDI detector. The control switch is configured to switch the traveling control executed by the traveling control processor and the light distribution control executed by the light-distribution control processor from standard traveling control to non-standard traveling control in a case where the vehicle entering the DDI is detected as the result of the DDI determination made by the DDI detector. The control switch is configured to switch the traveling control executed by the traveling control processor and the light distribution control executed by the light-distribution control processor from the non-standard traveling control to the standard traveling control in a case where the vehicle exiting from the DDI is detected as the result of the DDI determination made by the DDI detector.

An aspect of the technology provides a vehicle drive assist apparatus to be applied to a vehicle. The vehicle drive assist apparatus includes a surrounding-condition-information sensor, a vehicle-state-information sensor, and circuitry. The surrounding-condition-information sensor is configured to recognize a surrounding condition around the vehicle to acquire surrounding condition information. The vehicle-state-information sensor is configured to recognize an operational state of the vehicle to acquire vehicle state information. The circuitry is configured to execute light distribution control to control distribution of illumination light to a region in front of the vehicle by controlling an illumination device of the vehicle, execute traveling control of the vehicle in accordance with traffic lane designation, detect a diverging diamond interchange (DDI) in the region in front of the vehicle on the basis of the surrounding condition information, make a DDI determination as to whether the vehicle is entering the DDI or exiting from the DDI on the basis of the surrounding condition information and the vehicle state information, and switch the traveling control executed by the traveling control processor on the basis of the result of the DDI determination. The circuitry is configured to switch the traveling control and the light distribution control from standard traveling control to non-standard traveling control in a case where the vehicle entering the DDI is detected as the result of the DDI determination, and switch the traveling control and the light distribution control from the non-standard traveling control to the standard traveling control in a case where the vehicle exiting from the DDI is detected as the result of the DDI determination.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

Figure 1:
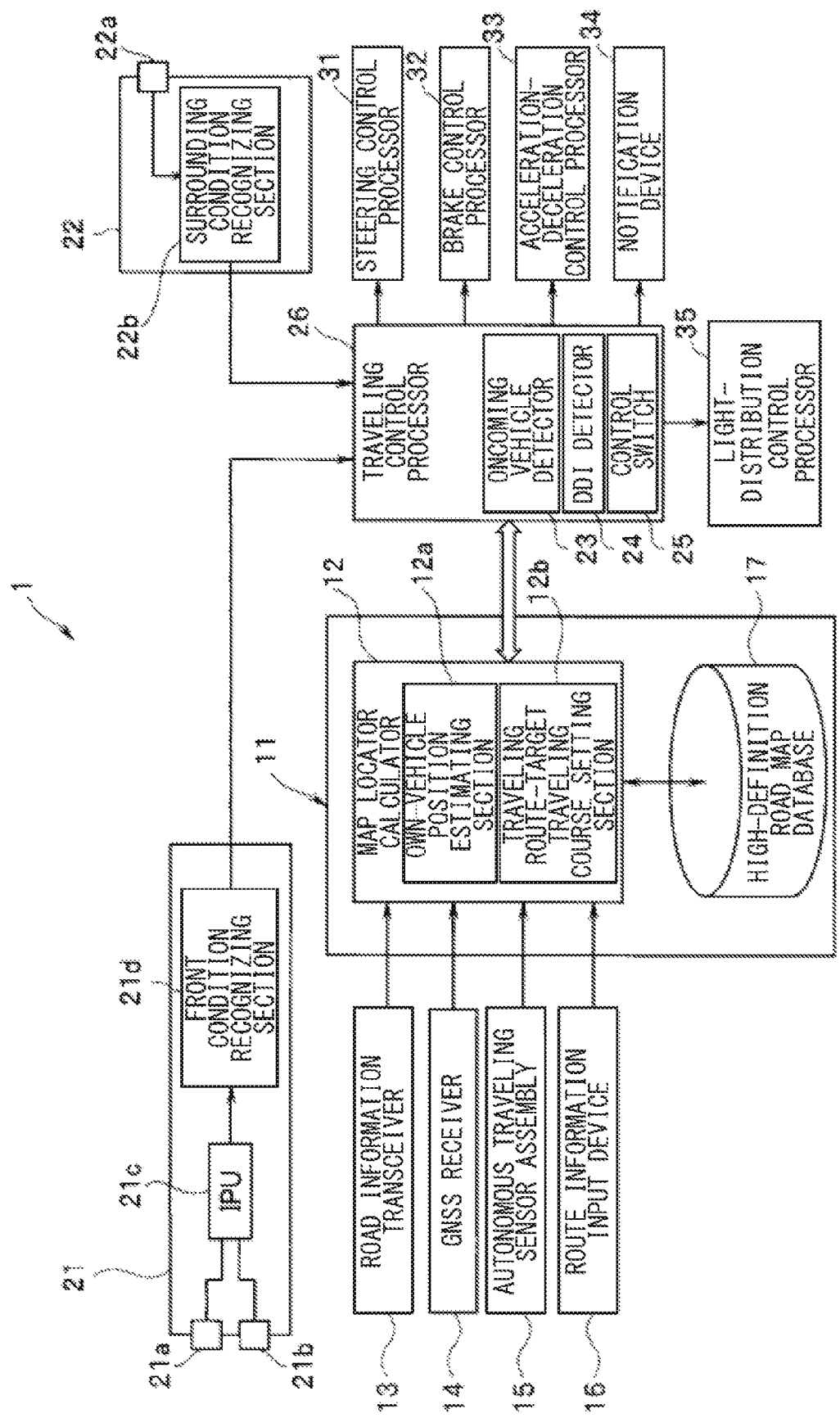
FIG. 1 is a block diagram schematically illustrating an exemplary configuration of a drive assist apparatus according to one example embodiment of the technology.

Traffic regulations for vehicle traveling roads, such as traffic lane designation of right-hand traffic or left-hand traffic, are generally established as basic regulations prevailing over a wide range, such as a country or district. Thus, switchover between the left-hand traffic regulation and the right-hand traffic regulation are hardly supposed to happen in a predetermined region such as a country or a district.

An existing drive assist apparatus determines to execute traveling control of the own vehicle on the basis of information on surrounding circumstances of the own vehicle acquired by various sensing devices, for example. In this case, the traveling control of the own vehicle can differ between when the own vehicle is traveling on a right-hand traffic region and when the own vehicle is traveling on a left-hand traffic region. In general, the basic traveling control executed by the existing drive assist apparatus has been fixed in consideration of road conditions (e.g., right-hand traffic or left-hand traffic) of the shipping destination of the own vehicle.

For example, in a case where the own vehicle is traveling in a right-hand traffic region, an oncoming-vehicle emerging expected region in which an oncoming vehicle traveling in the opposite direction to the own vehicle is expected to emerge is fixed in a region mainly in right front of the own vehicle when viewed in the width direction of the own vehicle. In contrast, in a case where the own vehicle is traveling in a left-hand traffic region, the oncoming-vehicle emerging expected region is fixed in a region mainly in left front of the own vehicle when viewed in the width direction of the own vehicle.

Additionally, the illumination light emitted from the headlight during night drive is distributed in consideration of the oncoming-vehicle emerging expected region. Thus, the light distribution needs to be performed in a different way between right-hand traffic and left-hand traffic.

That is, the existing drive assist apparatus has condition settings for the vehicle traveling control and the headlight distribution control (e.g., the condition settings for recognizing oncoming vehicles) that are fixed in consideration of the traffic lane designation (i.e., the right-hand traffic regulation or the left-hand traffic regulation) of an expected shipping destination of the vehicle. It has not been supposed that the traffic lane designation is switched between the left-hand traffic and the right-hand traffic in the shipping destination.

The existing drive assist apparatus can wrongly detect an oncoming vehicle or fail to surely detect an oncoming vehicle when the own vehicle enters a region such as the DDI in which the positional relationship between the own-vehicle lane and the oncoming-vehicle lane is temporally reversed. The existing drive assist apparatus thus has difficulty in achieving highly accurate and safe traveling control.

It is desirable to provide a vehicle drive assist apparatus that makes it possible to execute highly accurate and safe traveling control in accordance with a traffic regulation even while the own vehicle is traveling on a road infrastructure having an irregular structure such as the DDI.

Some example embodiments of the technology will now be described in detail with reference to the accompanying drawings. Note that the drawings used in the following description are schematic and are not intended to be drawn to scale, and the dimensional relationship and scale reduction of the elements illustrated in the drawings may differ between the elements in order to illustrate each component in a size large enough to be recognized on the drawings. Thus, factors including, without limitation, numerical values, shapes, materials, dimensional ratios, and positions of the elements, and how the elements are coupled to each other are illustrative only and not to be construed as limiting to the technology. Further, the elements in the following example embodiments that are not recited in a most-generic independent claim of the technology are optional and may be provided on an as-needed basis.

A drive assist apparatus according to an example embodiment of the technology may be mounted on a vehicle such as an automobile. The drive assist apparatus may execute traveling control to assist driving operations of a driver of the vehicle.

The drive assist apparatus according to the example embodiment of the technology acquires information on a condition in front of and around an own vehicle (hereinafter simply referred to as surrounding condition information). For example, the drive assist apparatus may acquire the surrounding condition information using an in-vehicle camera unit or a sensing device such as a radar sensor, for example. The surrounding condition information may be information on other vehicles and bicycles traveling around the own vehicle, and pedestrians and obstacles present in front of and around the own vehicle, for example. Further, the drive assist apparatus may recognize road conditions on the basis of the acquired surrounding environment information and road map information received via communication with an external device such as a high-definition road map database or the like. The road conditions may be relevant to preceding vehicles, following vehicles, various obstacles, and the form of the road, for example. The drive assist apparatus according to the example embodiment of the technology may use these information items (i.e., the surrounding condition information and the road map information) when executing the traveling control that assists driver's driving operations.

First, an exemplary schematic configuration of a drive assist apparatus 1 according to an exemplary embodiment of the technology is described with reference to a block diagram illustrated in FIG. 1.

Basically, the drive assist apparatus 1 according to the example configuration may have substantially the same configuration as an existing drive assist apparatus. Thus, only a main configuration of the drive assist apparatus 1 according to the example embodiment is described in the following description. A detailed description of the other minor configuration is omitted herein because it is supposed to be the same as that of the existing drive assist apparatus. Note that only main components of the drive assist apparatus 1 according to the example embodiment of the technology are illustrated in FIG. 1. Illustration of the other minor components not directly relevant to the technology is omitted in FIG. 1.

The drive assist apparatus 1 according to the example embodiment of the technology may be a control processor that executes traveling control for automatically driving or assisting drive's driving operations. The drive assist apparatus 1 may be mounted in an own vehicle. As illustrated in FIG. 1, the drive assist apparatus 1 may include a locator unit 11, a camera unit 21, a surrounding condition monitoring unit 22, and a traveling control processor 26 as the main components.

The locator unit 11 may be an information acquiring device that estimates the position of the own vehicle on a road map (hereinafter simply referred to as an own-vehicle position), and acquires road map information on a road extending mainly in front of the own-vehicle position. The locator unit 11 may include a map locator calculator 12 and a high-definition road map database 17 serving as a map data memory.

The map locator calculator 12 may include an own-vehicle position estimating section 12a and a traveling route-target traveling course setting section 12b, for example. The own-vehicle position estimating section 12a may estimate the own-vehicle position. The traveling route-target traveling course setting section 12b may set a traveling route from the estimated own-vehicle position to a destination through a via point.

The map locator calculator 12 may perform map matching of the own-vehicle position estimated by the own-vehicle position estimating section 12a on the road map to identify a current position of the own vehicle, and acquire road map information including information on a surrounding condition around the current position of the own vehicle. Additionally, the map locator calculator 12 may cause the traveling route-target traveling course setting section 12b to set a target traveling course of the own vehicle.

For example, the own-vehicle position estimating section 12a may acquire the coordinates (latitude and longitude) of the current position of the own vehicle on the basis of positioning signals received from a global navigation satellite system (GNSS) receiver 14. The own-vehicle position estimating section 12a may perform map matching of the acquired coordinates of the current position of the own vehicle on the map information to estimate the own-vehicle position (i.e., the current position) on the road map. The own-vehicle position estimating section 12a may also identify the traveling lane on which the own vehicle is traveling and retrieve information on the road shapes of the traveling lanes and the merging lanes, the interchanges provided on the set traveling route, and the like from the map information, and store these data items in a sequential manner.

The traveling route-target traveling course setting section 12b may refer to a local dynamic map or high-definition road map information stored in the high-definition road map database 17 on the basis of the information on the own-vehicle position (the latitude and longitude of the own vehicle position) estimated by the own-vehicle position estimating section 12a and the position information (latitude and longitude) of the destination (and the via point, if any) inputted by the driver. The traveling route-target traveling course setting section 12b may then construct a traveling route connecting the own-vehicle position to the destination (through the via point, if any) on the local dynamic map in accordance with predetermined route conditions (e.g., a recommended route or the shortest route).

The map locator calculator 12, a front condition recognizing section 21d and a surrounding condition recognizing section 22b that are described below, and the traveling control processor 26 may be each configured by a known microcomputer including a central processing unit (CPU), a random access memory (RAM), a read only memory (ROM), or a non-volatile memory and peripheral devices of the microcomputer, for example. The ROM may preliminarily store programs to be executed by the CPU and fixed data such as data tables.

The high-definition road map database 17 may be configured by a mass storage medium such as a hard disk drive (HDD) or a solid state drive (SSD), for example. The high-definition road map database 17 may store known high-definition road map information (a local dynamic map). The high-definition road map information may have the same layer structure as a global dynamic map stored in a cloud server, for example. For instance, the high-definition road map information may have a hierarchical structure in which additional map information for supporting automatic driving is superimposed on the undermost layer.

The additional map information may include static position information and dynamic position information. Examples of the static position information may include information on the types of roads (e.g., general roads or highways), the shapes of roads, right and left lane dividing lines (lane boundary lines), the forms of entrances and exits (interchanges) of highways or bypass roads, the length from the entrance to the exit (i.e., from the start point to the end point) of a branch lane or a merging lane connected to a junction, service areas, parking areas, or the like. Examples of the dynamic position information may include information on traffic congestion or traffic restrictions set due to accidents or construction work.

When the map locator calculator 12 sets a traveling route, the additional map information may serve as peripheral information necessary for autonomous traveling of the own vehicle along the set traveling route. The additional map information may be continuously acquired from the global dynamic map and sequentially updated.

To the input side of the map locator calculator 12, a road information transceiver 13, the GNSS receiver 14 that acquires the own-vehicle position, an autonomous traveling sensor assembly 15 that acquires driving states, and a route information input device 16 may be coupled.

The road information transceiver 13 may acquire various information items, such as information necessary for automatic driving or map information including information on the form of the road, from a non-illustrated cloud server connected to the road information transceiver 13 via a non-illustrated base station or the internet. The road information transceiver 13 may output the acquired information to the map locator calculator 12 in the locator unit 11. The map locator calculator 12 may perform map matching of the own-vehicle position on the map on the basis of the map information received by the road information transceiver 13, and construct a traveling route connecting the own-vehicle position and a destination inputted. Further, the map locator calculator 12 may set a target traveling course along which automatic driving of the own vehicle is to be performed on the constructed traveling route. The target traveling course may extend over several kilometers ahead of the own vehicle. The items set as the target traveling course may include information on the lane on which the own vehicle is caused to travel (e.g., information as to which lane the own vehicle is cased to travel among three lanes of the road), lane changing to overtake a preceding vehicle, time to start the lane changing, or the like. The road information transceiver 13 may also transmit various information items acquired by the own vehicle, such as the information on the surrounding conditions of the own vehicle including traffic congestion information or other dynamic information, to the non-illustrated server, other vehicles present around the own vehicle, or the like.

The GNSS receiver 14 may receive positioning signals from positioning satellites. The GNSS receiver 14 may output the received positioning signals to the map locator calculator 12 in the locator unit 11. The map locator calculator 12 may estimate the own vehicle position (the latitude and longitude of the own vehicle) on the basis of the positioning signals transmitted from the positioning satellites to the GNSS receiver 14.

The autonomous traveling sensor assembly 15 may include various sensors that detect the state of the own vehicle while the own vehicle is traveling in a region, such as a tunnel region, where it is difficult to receive valid positioning signals from the GNSS satellites due to low receiver sensitivity, in order to enable autonomous traveling of the own vehicle. Examples of the sensors may include a vehicle speed sensor, a yaw rate sensor, a forward-backward acceleration sensor, and a steering angle sensor. As described below, the vehicle state information on an operational state of the own vehicle detected by the sensors in the autonomous traveling sensor assembly 15 may be transmitted to the map locator calculator 12. In one embodiment, the autonomous traveling sensor assembly 15 and the map locator calculator 12 may serve as a "vehicle-state-information acquiring unit".

When the own vehicle enters a tunnel, for example, the map locator calculator 12 may make a switch to autonomous navigation. At this time, the vehicle speed sensor in the autonomous traveling sensor assembly 15 may detect the vehicle speed of the own vehicle, the yaw rate sensor in the autonomous traveling sensor assembly 15 may detect the yaw rate (yaw angular speed) of the own vehicle, the forward-backward acceleration sensor in the autonomous traveling sensor assembly 15 may detect a forward or backward acceleration rate, and the steering angle sensor in the autonomous traveling sensor assembly 15 may detect the steering angle of the own vehicle. The information on the vehicle speed, the yaw rate (yaw angular speed), the forward or backward acceleration rate, the steering angle, and the like detected by the autonomous traveling sensor assembly 15 may be outputted to the map locator calculator 12. The own-vehicle position estimating section 12a of the map locator calculator 12 may determine the moving distance and azimuth of the own vehicle on the basis of the received information on the vehicle speed, the yaw rate, the forward or backward acceleration rate, the steering angle, and the like, and thereby perform localization of the own vehicle on the basis of the determined moving distance and azimuth of the own vehicle.

The route information input device 16 may be a terminal device to be operated by an occupant, such as the driver or a passenger, in the own vehicle. The route information input device 16 may collectively transmit a series of information items, including setting information of the destination and the via point (e.g., a service area of a highway), necessary for the map locator calculator 12 to determine the traveling route.

For example, the route information input device 16 may be an input unit (e.g., a touch panel of a monitor) of a car navigation system, a portable device such as a smartphone, or a personal computer. The route information input device 16 may be in wired or wireless connection with the map locator calculator 12.

When the driver or passenger operates the route information input device 16 to input the information on the destination and the via point (e.g., the name, address, or telephone number of the facility), the input information may be read by the map locator calculator 12. The map locator calculator 12 may then determine the position coordinates (latitudes and longitudes) of the destination and the via point.

The camera unit 21 may serve as a part of a surrounding-condition-information acquiring unit that recognizes the condition mainly in the traveling direction of the own vehicle (in front of the own vehicle) as the surrounding condition information. Further, the camera unit 21 may determine the road curvature of the middle of the own-vehicle lane defined between the right and left lane dividing lines (lane boundary lines) respectively defining the right and left sides of the own-vehicle lane. Additionally, the camera unit 21 may detect a lateral positional deviation of the own vehicle in the width direction of the own vehicle with respect to the middle between the right and left lane dividing lines.

For example, the camera unit 21 may recognize various conditions of the road surrounding the own vehicle: three-dimensional objects including mobile objects, such as other vehicles traveling in front of or by the own vehicle (e.g., preceding vehicles, vehicles traveling in parallel with the own vehicle, and oncoming vehicles), and bicycles or motorcycles traveling in parallel with the own vehicle; signal indication such as the color, blinking state, or arrow direction of a signal; road signs; and road marks such as stop lines, lane boundary lines, and arrows for regulating traveling directions.

The camera unit 21 may be fixed on an upper middle portion of the front interior compartment of the own vehicle, for example. The camera unit 21 may include an in-vehicle stereo camera, an image processing unit (IPC) 21*c*, and a front condition recognizing section 21*d*, for example. The in-vehicle stereo camera may include a main camera 21*a* and a sub-camera 21*b* that are disposed laterally symmetrical about the middle of the width of the own vehicle. The camera unit 21 may acquire reference image data using the main camera 21*a* and comparative image data using the sub-camera 21*b*, for example.

The reference image data acquired by the main camera 21*a* and the comparative image data acquired by the sub-camera 21*b* may be subjected to predetermined image processing in the IPU 21*c*. The front condition recognizing section 21*d* may read the reference image data and the comparative image data after the image processing in the IPU 21*c* to recognize an identical object between the reference image data and the comparative image data on the basis of a parallax between the reference image data and the comparative image data. Additionally, the front condition recognizing section 21*d* may calculate distance data on the distance from the own vehicle to the object on the basis of the principle of triangulation, and recognize the distance data as front condition information.

The front condition information may include various information items such as information on the shape of the traveling road (e.g., merging lane or traveling lane) on which the own vehicle is traveling (e.g., right and left lane dividing lines or lane boundary lines, the curvature [1/m] of the middle of the lane defined by the lane dividing lines, and the width between the right and left lane dividing lines (i.e., the width of the lane)); the entrance and the exit (interchanges) of a highway or a bypass road; the width of a merging lane connected to a junction or the width of a branch lane between the lane dividing lines; intersections; crosswalks; traffic lights; road signs; road marks; roadside obstacles (e.g., power poles, telephone poles, and parked vehicles); behaviors of other vehicles traveling in front of or around the own vehicle; and sounds generated by the other vehicles, for example.

The surrounding condition monitoring unit 22 may serve as a part of the surrounding-condition-information acquiring unit that recognizes the surrounding condition of the own vehicle to recognize the surrounding condition information. The surrounding condition monitoring unit 22 may include a surrounding condition recognizing sensor 22*a* and a surrounding condition recognizing section 22*b*, for example.

The surrounding condition recognizing sensor 22*a* may be an autonomous sensor. For example, the surrounding condition recognizing sensor 22*a* may be a sensing device, such as an ultrasonic sensor, a millimeter-wave radar, a light detection and ranging (LIDER), or a camera, or a detector including an appropriate combination thereof.

The surrounding condition recognizing section 22*b* may acquire the surrounding condition information on mobile objects present around the own vehicle (e.g., vehicles traveling in parallel with the own vehicle, vehicles following the own vehicle, vehicles traveling on an adjacent lane, or oncoming vehicles) on the basis of an output signal received from the surrounding condition recognizing sensor 22*a*. The surrounding condition recognizing section 22*b* may include a sensor that acquires various information items, such as information on sounds generated by a mobile object present around the own vehicle, for example.

In one embodiment, the surrounding condition monitoring unit 22 and the camera unit 21 may serve as the "surrounding-condition-information acquiring unit" of the drive assist apparatus 1. The front condition recognizing section 21*d* of the camera unit 21 and the surrounding condition recognizing section 22*b* of the surrounding condition monitoring unit 22 may be coupled to the input side of the traveling control processor 26.

For example, the traveling control processor 26 may recognize the traffic lane designation (a right-hand traffic regulation or a left-hand traffic regulation) on the basis of the information on the condition in front of and around the own vehicle (hereinafter simply referred to as surrounding condition information) acquired by the surrounding-condition-information acquiring unit including the camera unit 21 and the surrounding condition monitoring unit 22 and various sensing devices. Thereafter, the traveling control processor 26 may determine to execute the traveling control of the own vehicle in accordance with the traffic lane designation.

The traveling control processor 26 may be connected to the map locator calculator 12 via a non-illustrated in-vehicle communication line, such as a controller area network ((CAN), in a mutually communicable manner.

To the output side of the traveling control processor 26, a steering control processor 31, a brake control processor 32, an acceleration-deceleration control processor 33, a notification device 34, and a light-distribution control processor 35 may be coupled, for example. The steering control processor 31 may control the traveling direction of the own vehicle by causing the own vehicle to travel along the traveling route. The brake control processor 32 may decelerate the own vehicle through, for example, forcible braking by controlling a non-illustrated brake device. The acceleration-deceleration control processor 33 may control the vehicle speed of the own vehicle. The notification device 34 may display or indicate various notification information items using a monitor or a speaker, for example. The light-distribution control processor 35 may execute light distribution control to control the distribution of illumination light to a region in front of the own vehicle mainly by controlling a non-illustrated headlight (illumination device) during night drive.

In a case where an automatic driving section in which automatic driving control is allowed to be executed is set in the traveling route determined by the traveling route-target traveling course setting section 12*b*, the traveling control processor 26 may set a target traveling course for automatic driving within the automatic driving section. In the automatic driving section, the traveling control processor 26 may cause the own vehicle to automatically travel along the target traveling course by controlling the steering control processor 31, the brake control processor 32, and the acceleration-deceleration control processor 33 as appropriate on the basis of the positioning signals indicative of the own-vehicle position received by the GNSS receiver 14.

In a case where a preceding vehicle is detected on the basis of the front condition information recognized by the front condition recognizing section 21*d*, the traveling control processor 26 may cause the own vehicle to travel following the preceding vehicle by executing known adaptive cruise control (ACC) or active lane keep (ALK) control, for example. In a case where no preceding vehicle is detected, the traveling control processor 26 may cause the own vehicle to travel at a set vehicle speed equal to or lower than a speed limit by executing the ACC or the ALK control, for example.

Further, the traveling control processor 26 may perform various detection processes and determinations for the traveling control to avoid contact with another vehicle on the basis of the front condition information recognized by the front condition recognizing section 21*d* and the surrounding condition information on preceding vehicles, following vehicles, oncoming vehicles, and the like recognized by the surrounding condition monitoring unit 22.

When determining that contact with another vehicle is estimated, for example, the traveling control processor 26 may execute the traveling control of the own vehicle by operating the steering control processor 31, the brake control processor 32, and the acceleration-deceleration control processor 33 as appropriate on the basis of the recognized information. At the same time or before executing the traveling control, the traveling control processor 26 may issue a predetermined notification to the driver by operating the notification device 34. For example, the traveling control processor 26 may cause a predetermined display device to display a predetermined notification as appropriate.

The notification issued by the notification device 34 to the driver may be a notification sound, a notification display appearing on the instrument panel, or the like based on the front condition information and the surrounding condition information recognized by the traveling control processor 26 using the front condition recognizing section 21*d* and the surrounding condition recognizing section 22*b*.

Further, the notification device 34 may issue various audible or visible indications to the driver depending on the situation. For example, the notification device 34 may generate a message urging the driver to perform a necessary driving operation, such as a message saying "push the brake pedal" or "correct the steering angle".

The traveling control processor 26 may further control the light-distribution control processor 35 on the basis of the front condition information acquired by the front condition recognizing section 21*d*, the surrounding condition information acquired by the surrounding condition monitoring unit 22, and the like during night drive. That is, the traveling control processor 26 executes the light distribution control to control the distribution of illumination light to the region in front of the own vehicle in consideration of mobile objects such as oncoming vehicles and bicycles or pedestrians moving around the own vehicle.

As described above, the traveling control processor 26 may perform various determinations to control the steering control processor 31, the brake control processor 32, the acceleration-deceleration control processor 33, the notification device 34, the light-distribution control processor 35, and the like on the basis of the information received from the front condition recognizing section 21*d* and the surrounding condition recognizing section 22*b*, and the information received from the road information transceiver 13, the GNSS receiver 14, the autonomous traveling sensor assembly 15, the route information input device 16, and the like.

The traveling control processor 26 may include an oncoming vehicle detector 23, a DDI detector 24, and a control switch 25, for example.

The oncoming vehicle detector 23 may detect a mobile object moving in front of the own vehicle toward the own vehicle as an oncoming vehicle on the basis of the surrounding condition information acquired by various sensing devices and the surrounding-condition-information acquiring unit including the camera unit 21 and the surrounding condition monitoring unit 22, for example. Additionally, the oncoming vehicle detector 23 may detect the position of the detected oncoming vehicle (e.g., detect whether the oncoming vehicle is positioned in left front of the own vehicle or in right front of the own vehicle). Note that a detailed description of the process performed by the oncoming vehicle detector 23 to detect an oncoming vehicle is omitted herein because the process may be the same as that executed by an existing drive assist apparatus.

The DDI detector 24 may detect an interchange having an irregular structure, such as a diverging diamond interchange (hereinafter simply referred to as DDI), in a region in front of the own vehicle and on the own vehicle traveling route on the basis of the additional map information stored in the high-definition road map database 17 or the surrounding condition information acquired by various sensing devices or the surrounding-condition-information acquiring unit including the camera unit 21 and the surrounding condition monitoring unit 22, for example. The DDI detector 24 may further detect the state of the own vehicle entering the DDI and the state of the own vehicle exiting from the DDI, for example. The phrase "the state of the own vehicle entering the DDI" may refer to the state of the own vehicle before entering the DDI, the state of the own vehicle now entering the DDI, or the state of the own vehicle after entering the DDI. That is, the phrase may refer to an overall state of the own vehicle entering the DDI from the outside of the DDI. Likewise, the phrase "the state of the own vehicle exiting from the DDI" may refer to the state of the own vehicle before exiting from the DDI, the state of the own vehicle now exiting from the DDI, and the state of the own vehicle after exiting from the DDI. That is, the phrase may refer to an overall state of the own vehicle exiting from the DDI to the outside the DDI.

For example, the DDI detector 24 may detect a predetermined region of the DDI, such as a first intersection CR1 or a merging point of the branch passages of the highway road, and a second intersection CR2 or a branching point of the highway road. The first intersection CR1 may be an entrance of a region in which the relative positional relationship between an own vehicle lane and an oncoming vehicle lane is reversed in the lateral direction (see a predetermined region RL surrounded by a broken line in FIG. 2). The second intersection CR2 may be an exit of the predetermined region RL. The DDI detection process performed by the DDI detector 24 will be described in detail later.

When the own vehicle entering the predetermined region RL of the DDI or the own vehicle exiting from the predetermined region RL of the DDI is recognized on the basis of the results of the detection by the DDI detector 24, the control switch 25 may switch the control condition for executing the traveling control between a control condition based on left-hand traffic and a condition based on right-hand traffic.

The DDI may be provided with the region in which the relative positional relationship is reversed in the lateral direction between the own-vehicle lane on which the own vehicle is traveling and the oncoming-vehicle lane on which other vehicles are traveling in the direction opposite to the traveling direction of the own vehicle. The region may be located in part of a general road including the entrance and the exit of the highway.

In this case, it is necessary to execute different traveling control on the basis of different conditions depending on the traveling condition of the own vehicle: standard traveling control may be executed when the own vehicle is traveling on the right lane (i.e., in a standard traveling condition where right-hand traffic is required by the traffic lane designation) while non-standard traveling control may be executed when the own vehicle is traveling within the predetermined region RL of the DDI (i.e., in a traveling condition where the positional relationship between the own-vehicle lane and the oncoming-vehicle lane is reversed, e.g., where the own vehicle is traveling on the left lane despite the fact that right-hand traffic is required in the standard traveling condition).

For example, in the standard traveling condition where right-hand traffic is required, an oncoming vehicle is detected mainly in left front of the own vehicle when viewed in the width direction. In contrast, in the condition where the own vehicle is traveling within the predetermined region RL of the DDI in which the relative positional relationship between the own-vehicle lane and the oncoming-vehicle lane is reversed in the lateral direction, an oncoming vehicle is detected mainly in right front of the own vehicle when viewed in the width direction of the own vehicle because the own vehicle is traveling on the left side of the road. Accordingly, the oncoming vehicle detector 23 may detect an oncoming vehicle on the basis of different control conditions between when the traffic lane designation is the right-hand traffic regulation and when the traffic lane designation is the left-hand traffic regulation. Additionally, the light distribution control of the illumination light emitted from the head light during night drive may be performed in consideration of the oncoming-vehicle emerging expected region. Accordingly, the light distribution control may be performed in a different way between when the traffic lane designation is the right-hand traffic regulation and when the traffic lane designation is the left-hand traffic regulation. Thus, when the traffic lane designation is switched to another one, it is necessary to switch the traveling control to conform to the other traffic lane designation in order to cause the own vehicle to constantly travel under the control in accordance with the traffic lane designation.

In this case, if the DDI detector 24 detects the own vehicle entering or exiting from the predetermined region RL of the DDI, the control switch 25 may switch the traveling control so that the traveling control is executed on the basis of an appropriate condition in accordance with the corresponding traffic lane designation.

When the traveling control is switched by the control switch 25 in accordance with the traffic lane designation, the traveling control processor 26 controls the light-distribution control processor 35 to execute the light distribution control to control the distribution of illumination light to the region in front of the own vehicle in consideration of mobile objects, such as oncoming vehicles and bicycles or pedestrians moving around the own vehicle. For example, in the light distribution control, the high-beam mode may be switched to the low-beam mode when a light beam of the headlight of an oncoming vehicle is detected, while the low-beam mode is switched to the high-beam mode when an oncoming vehicle is no longer detected.

In the case of right-hand traffic, for example, the oncoming-vehicle emerging expected region may be set in a region mainly in left front of the own vehicle. Thus, the light distribution control may be performed so that the illumination light emitted from the headlight of the own vehicle is not directly incident on an oncoming vehicle appearing in the oncoming-vehicle emerging expected region even in the high-beam mode.

Further, in the case of a right-hand traffic general road having an oncoming lane on the left side, for example, pedestrians and bicycles sometimes travel mainly in right front of the own vehicle. Thus, the light distribution control may be performed so that the illumination light emitted from the headlight of the own vehicle to the region in right front of the own vehicle is controlled in consideration of these mobile bodies. The exemplary configuration of the drive assist apparatus 1 has been schematically described above.

Figure 2:
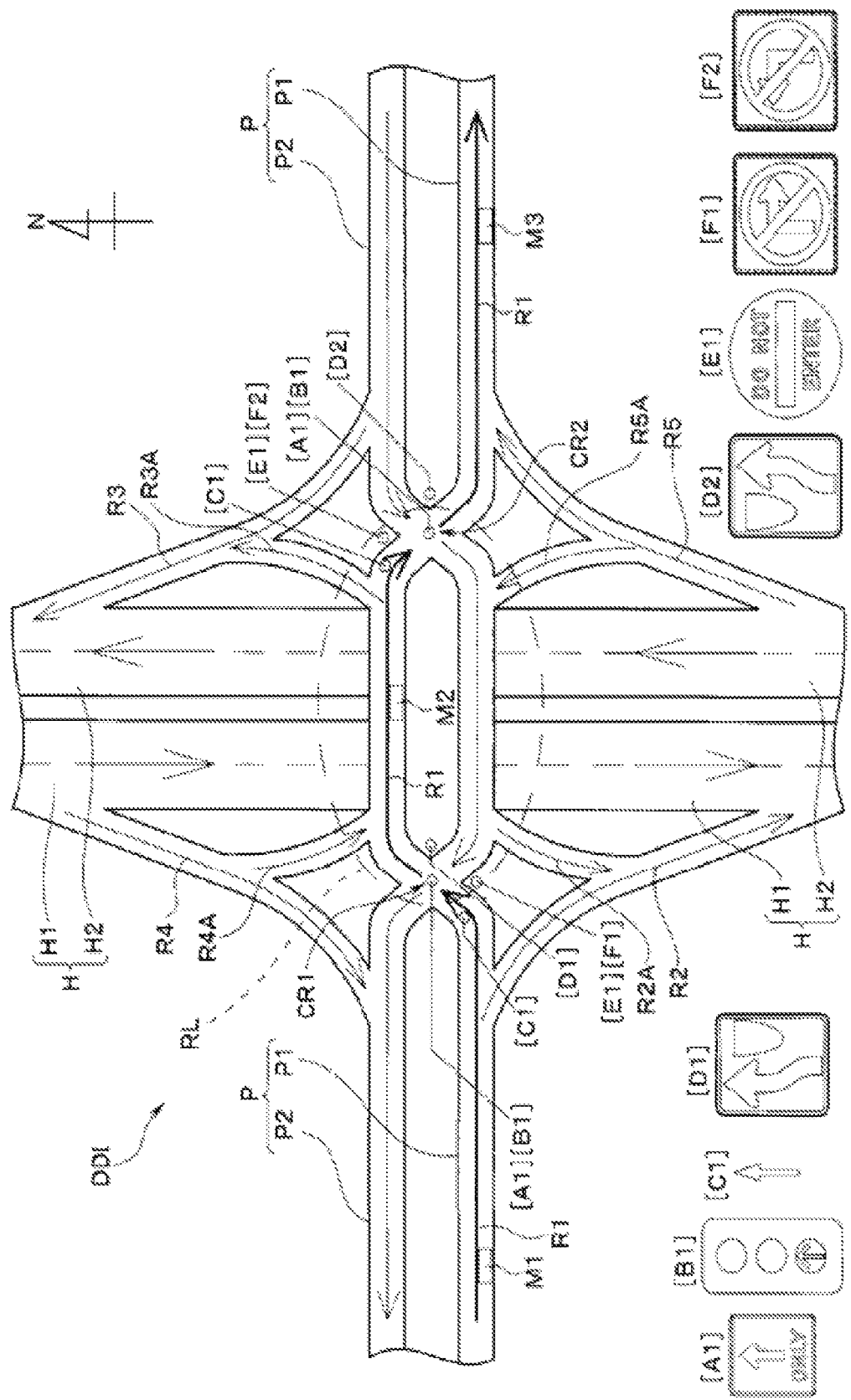
FIG. 2 is a schematic plan view of an exemplary structure of a DDI.

An exemplary structure of the DDI will now be described. FIG. 2 is a plan view schematically illustrating an exemplary structure of the DDI. With reference to FIG. 2, an exemplary road system is described which is based on the traffic lane designation requiring right-hand traffic. In FIG. 2, the upper side faces north, the lower side faces south, the right side faces east, and the left side faces west.

As described above, the DDI may be provided with the region in which the relative position relationship is reversed in the lateral direction between the own-vehicle lane on the own vehicle is traveling and the oncoming-vehicle lane on which other vehicles are traveling in the direction opposite to the traveling direction of the own vehicle.

FIG. 2 illustrates an example in which a highway H extending in a south-north direction and a general road P extending in an east-west direction are in grade separation, and interchanges or the entrance and exit of the highway H are provided on the grade separation portions.

In the example illustrated in FIG. 2, the highway H may have a lane H1 (two-lane road) directed in a north-south direction and a lane H2 (two-lane road) directed in the south-north direction. The general road P may have an own-vehicle lane P1 (two-lane road) directed in a west-east direction and an oncoming-vehicle lane P2 (two-lane road) directed in the east-west direction. The highway H and the general road P may be in grade separation. Within the predetermined region of the DDI of the general road P (e.g., the predetermined region RL surrounded by the broken line in FIG. 2), the relative positional relationship between the own-vehicle lane and the oncoming-vehicle lane is reversed in the lateral direction.

The following description is made on the assumption that the own vehicle (M1, M2, M3) is traveling on the own-vehicle lane P1 of the general road P, and other vehicles (oncoming vehicles) are traveling on the oncoming-vehicle lane P2 of the general road P.

In FIG. 2, a traveling route R1 of the own vehicle traveling on the general road P is indicated by a heavy line arrow. The following description is made focusing mainly on the own vehicle traveling along the traveling route R1.

In FIG. 2, the own vehicle traveling on the own-vehicle lane P1 and in a region before the exit of the DDI is denoted by a reference numeral M1. The own-vehicle lane P1 on which the own vehicle M1 is traveling is provided on the right side of the general road P when viewed from the driver of the own vehicle M1. The oncoming-vehicle lane P2 is provided on the left side of the general road P when viewed from the own vehicle M1.

The own vehicle M1 in such a situation is supposed to enter the predetermined region RL of the DDI through the entrance. At the entrance of the DDI, the first intersection CR1 with a traffic light is installed. The first intersection CR1 is installed to cross the own-vehicle lane P1 (on the right side) and the oncoming-vehicle lane P2 (on the left side), so that the relative positional relationship between the own-vehicle lane P1 and the oncoming-vehicle lane P2 is reversed in the lateral direction.

After the own vehicle M1 traveling on the own-vehicle lane P1 (on the right side) passes through the first intersection CR1, the position of the own-vehicle lane P1 on which the own vehicle M1 is traveling is changed to the left side, and the position of the oncoming-vehicle lane P2 is changed to the right side when viewed from the own vehicle. The own vehicle traveling within the predetermined region RL (the region in which the relative positional relationship between the own-vehicle lane P1 and the oncoming-vehicle lane P2 is reversed in the lateral direction) is denoted by a reference numeral M2.

Thereafter, the own vehicle M2 may travel within the predetermined region RL and eventually exit from the predetermined region RL of the DDI. At the exit of the predetermined region RL of DDI on the traveling route R1, the second intersection CR2 with a traffic light is installed. The second intersection CR2 is installed to cross the own-vehicle lane P1 (on the left side) and the oncoming-vehicle lane P2 (on the right side) within the predetermined region RL, so that the relative positional relationship between the own-vehicle lane P1 and the oncoming-vehicle lane P2 is reversed in the lateral direction (i.e., the relative positional relationship between the own-vehicle lane P1 and the oncoming-vehicle lane P2 is returned to the original relationship).

After the own vehicle M2 traveling within the predetermined region RL on the own-vehicle lane P1 (on the left side) passes through the second intersection CR2, the position of the own-vehicle lane P1 on which the own vehicle is traveling is changed (returned) to the right side, and the position of the oncoming-vehicle lane P2 is changed (returned) to the left side. In FIG. 2, the own vehicle traveling on the own-vehicle lane P1 on the general road P after exiting from the predetermined region RL is denoted by a reference numeral M3.

Note that some entrances of the predetermined region RL are provided other than the first intersection CR1: branch passages branching from the highway H to enter and merge into the predetermined region RL of the DDI (e.g., traveling routes R4A and R5A illustrated in FIG. 2), for example. For example, after the own vehicle traveling on the lane H1 of the highway H in accordance with the right-hand traffic regulation passes through the branch passage (e.g., the traveling routes R4 and R4A illustrated in FIG. 2) to enter and merge into the predetermined region RL of the DDI on the own-vehicle lane P1 of the general road P, the own vehicle travels on the own-vehicle lane P1 located on the left side of the predetermined region RL of the DDI. That is, also in this case, the relative positional relationship between the lanes is reversed in the lateral direction. The same applies to the case where the vehicle traveling on the lane H2 of the highway H passes through the branch passage (e.g., the traveling routes R5 and R5A) to enter and merge into the predetermined region RL of the DDI of the oncoming-vehicle lane P2 of the general road P.

Note that some exits of the predetermined region RL are provided other than the second intersection CR2: branch passages branching from the predetermined region RL of the DDI toward the highway H (e.g., traveling routes R3A and R2A illustrated in FIG. 2), for example. For example, the own vehicle M2 traveling on the own-vehicle lane P1 (on the left side) within the predetermined region RL of the own-vehicle lane P1 passes through the branch passage (e.g., the traveling routes R3A and R3) connected to the lane H2 of the highway H to exit from the DDI and enter the lane H2 located on the right side of the highway H. That is, also in this case, the relative positional relationship between the lanes is reversed in the lateral direction. The same applies to the case where the vehicle traveling on the oncoming-vehicle lane P2 within the predetermined region RL passes through the branch passage (e.g., the traveling routes R2A and R2) connected to the highway H to exit from the DDI and enter the lane H1 on the right side of the highway H.

Now, some traveling routes of the own vehicle (M1, M2, M3) other than the traveling route R1 are described with reference to arrows illustrated in FIG. 2.

The traveling route R2 allows the own vehicle M1 to directly merge into the lane H1 of the highway H from the own-vehicle lane P1 without passing through the predetermined region RL of the DDI. The traveling route R2A is part of a traveling route that allows a vehicle traveling on the oncoming-vehicle lane P2 to exit from the predetermined region RL of the DDI and enter the lane H1 of the highway H through a part of the traveling route R2. That is, the traveling route R2A is one of the exits of the predetermined region RL to the highway H, as described above.

The traveling route R3A is part of a traveling route that allows the own vehicle M2 traveling within the predetermined region RL to exit from the predetermined region RL and enter the lane H2 of the highway H through a part of a traveling route R3. That is, the traveling route R3A is one of the exits of the predetermined region RL to the highway H, as described above. The traveling route R3 allows a vehicle traveling on the oncoming-vehicle lane P2 of the general road P to directly merge into the lane H2 of the highway H without passing through the predetermined region RL of the DDI.

The traveling route R4 allows a vehicle traveling on the lane H1 of the highway H to directly merge into the oncoming-vehicle lane P2 of the general road P without passing through the predetermined region RL of the DDI. The traveling route R4A allows a vehicle traveling on the lane H1 of the highway H to enter and merge into the own-vehicle lane P1 located on the left side of the general road P within the predetermined region RL of the DDI through a part of the traveling route R4. That is, the traveling route R4A is one of the entrances of the predetermined region RL from the highway H.

The traveling route R5A allows a vehicle traveling on the lane H2 of the highway H to enter and merge into the oncoming-vehicle lane P2 of the general road P within the predetermined region RL of the DDI through a part of a traveling route R5. That is, the traveling route R5A is one of the entrances to the predetermined region RL from the highway H. A traveling route R5 allows a vehicle traveling on the lane H2 of the highway H to directly merge into the own-vehicle lane P1 of the general road P without passing through the predetermined region RL of the DDI.

As described above, the intersections CR1 and CR2 provided with traffic lights are respectively installed on the entrance and exit of the predetermined region RL of the DDI where the relative positional relationship between the lanes is reversed in the lateral direction.

In the example illustrated in FIG. 2, the first intersection CR1 is installed at the entrance of the predetermined region RL of the DDI through which the own vehicle M1 traveling on the own-vehicle lane P1 located on the right side (i.e., the own vehicle M1 traveling on a part of the own-vehicle lane P1 before the predetermined region RL) enters the predetermined region RL of the DDI. The own-vehicle lane P1 crosses with the oncoming-vehicle lane P2 at the first intersection CR1 so that the relative positional relationship between the own-vehicle lane P1 and the oncoming-vehicle P2 is reversed in the lateral direction.

Likewise, the second intersection CR2 is installed at the exit of the predetermined region RL of the DDI through which the own vehicle M2 traveling on the own-vehicle lane P1 located on the left side (i.e., the own vehicle M2 traveling on the part of the own-vehicle lane P1 within the predetermined region RL) exits from the predetermined region RL of the DDI. The own-vehicle lane P1 crosses with the oncoming-vehicle lane P2 at the second intersection CR2 so that the relative positional relationship between the own-vehicle lane P1 and the oncoming-vehicle lane P2 is returned to the original relationship in the lateral direction.

As described above, the DDI has a structure for reversing the relative positional relationship between the own-vehicle lane and the oncoming-vehicle lane in the lateral direction within a part of the general road P. This structure prevents vehicles traveling in the DDI from being thrown into confusion. Additionally, various traffic regulations are established in the form of various road signs, various road marks, and so forth provided near the intersections CR1 and CR2 of the DDI to ensure sufficient safety.

For example, a traveling direction regulation that permits vehicles to travel only in a straight direction is set for the intersections CR1 and CR2. For example, a STRAIGHT ONLY road sign A1 illustrated in FIG. 2, which prohibits traveling in directions other than the straight direction, is provided at each of the intersections CR1 and CR2. The road sign is provided beside the traffic light of each of the intersections CR1 and CR2 when viewed from a position before the intersections CR1 and CR2.

The traffic lights installed at the intersections CR1 and CR2 may be of a general type (not illustrated) or any type that indicates prohibition of traveling in directions other than the straight direction. For example, a traffic light B1 illustrated in FIG. 2 may be installed which is configured to display a straight arrow at a green light portion. The traffic light B1 permits vehicles to travel only in the straight direction while displaying a green straight arrow.

As illustrated in FIG. 2, the lanes may have slightly curved portions at the first intersection CR1, which is the entrance to the predetermined region RL of the DDI, and the second intersection CR2, which is the exit from the predetermined region RL. In this case, a road sign with a diagonal-up left arrow (not illustrated) may be installed at the entrance at the intersection CR1, and a road sign with a diagonal-up right arrow (not illustrated) may be installed at the exit at the intersection CR2 in place of the STRAIGHT ONLY road sign.

In the vicinity of the first intersection CR1, a KEEP LEFT road sign D1 illustrated in FIG. 2, which requires left-hand traffic, a DO NOT ENTER road sign E1 illustrated in FIG. 2, and a DO NOT TURN RIGHT road sign F1 illustrated in FIG. 2, and so forth are installed on the right side of the first intersection CR1 when viewed from a position in front of the first intersection CR1.

Likewise, in the vicinity of the second intersection CR2, a KEEP RIGHT road sign D2 illustrated in FIG. 2, the DO NOT ENTER road sign E1 illustrated in FIG. 2, a DO NOT TURN LEFT road sign F2 illustrated in FIG. 2, and so forth may be installed on the left side of the second intersection CR2 when viewed from a position in front of the second intersection CR2.

Additionally, various road marks, such as a straight-arrow road mark C1 illustrated in FIG. 2 and a stop line (not illustrated in FIG. 2, see FIGS. 3 to 6), are provided on the road surfaces in the vicinity of the intersections CR1 and CR2. The structure of the typical DDI has been schematically described above.

Next, some operations of the drive assist apparatus 1 according to the example embodiment are schematically described. In the following description, an exemplary operation performed by the drive assist apparatus 1 when the own vehicle enters the predetermined region RL of the DDI and an exemplary operation performed by the drive assist apparatus 1 when the own vehicle exits from the predetermined region RL are simply described.

When the own vehicle entering the predetermined region RL of the DDI or the own vehicle exiting from the predetermined region RL of the DDI is detected, the drive assist apparatus 1 according to the example embodiment may cause the control switch 25 to switch various settings for the traveling control to those in accordance with the surrounding condition.

For example, in a case where the own vehicle traveling on the own-vehicle lane P1 located on the right side of the right-hand traffic general road P is detected to enter the predetermined region RL of the DDI, the control switch 25 switches the setting on an oncoming-vehicle emerging expected region in which a control process for detecting an oncoming vehicle is conducted from a left region setting conforming to right-hand traffic to a right region setting conforming to left-hand traffic.

For example, in a case where the own vehicle traveling the own-vehicle lane P1 located on the left side is detected to exit from the predetermined region RL of the DDI, the control switch 25 switches the setting on the oncoming-vehicle emerging expected region in which the control process for detecting an oncoming vehicle is conducted from the right region setting conforming to left-hand traffic to the left region setting conforming to right-hand traffic.

The operation performed by the drive assist apparatus 1 according to the example embodiment when the own vehicle enters the predetermined region RL of the DDI will now be described first with reference to some examples.

Figure 3:
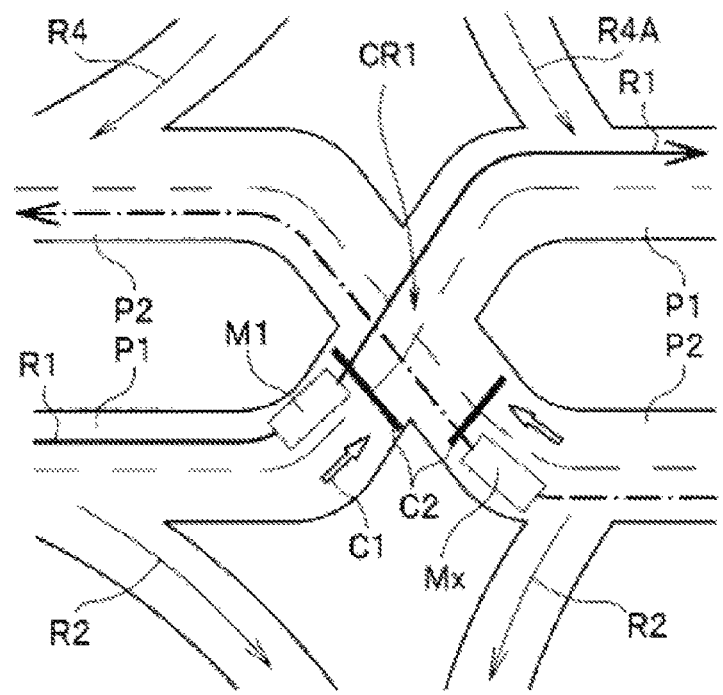
FIG. 3 is a conceptual diagram illustrating an exemplary situation where an own vehicle including the drive assist apparatus according to one example embodiment of the technology is entering the DDI region.
Figure 4:
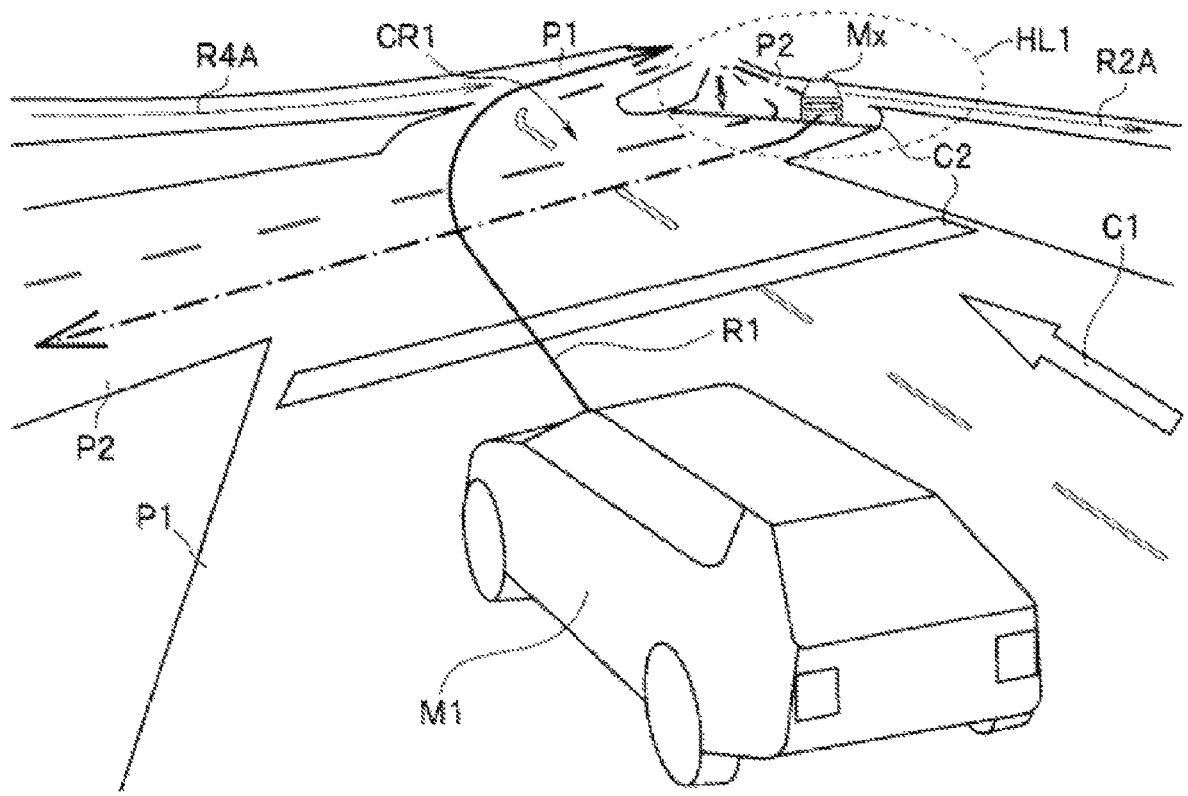
FIG. 4 is a conceptual diagram illustrating the situation illustrated in FIG. 3 viewed from above and behind the own vehicle.

FIGS. 3 and 4 are conceptual diagrams illustrating an exemplary surrounding conditions observed when the own vehicle M1 including the drive assist apparatus 1 according to the example embodiment detects the DDI in front of the own vehicle M1 while traveling on the own-vehicle lane P1 of the general road P and is detected to enter the predetermined region RL of the DDI. FIG. 3 is a plan view of a region in the vicinity of the first intersection CR1 of the DDI illustrated in FIG. 2. FIG. 4 is a conceptual diagram illustrating the region illustrated in FIG. 3 viewed from above and behind the own vehicle M1. Note that the traffic lights and road signs illustrated in FIG. 2 except some of them (e.g., the straight-arrow road mark C1 and the stop line C2) are not illustrated to simplify the drawings.

In the conditions illustrated in FIGS. 3 and 4, the own vehicle M1 having traveled on the own-vehicle lane P1 located on the right side of the right-hand traffic general road P may stop immediately before the stop line C2 provided on the road surface before the first intersection CR1 of the DDI at a red signal indication of the traffic light (not illustrated in FIGS. 3 and 4) installed at the first intersection CR1. In this case, the first intersection CR1 may be an entrance to the predetermined region RL of the DDI.

For example, while the own vehicle M1 is traveling along the traveling route R1 (illustrated in FIGS. 2 and 3) on the own-vehicle lane P1 of the general road P, the drive assist apparatus 1 mounted in the own vehicle M1 may acquire the surrounding condition information and the map information and execute general traveling control referring to the information.

The map information acquired by the drive assist apparatus 1 may include the information on the presence of the DDI in a region of the traveling route R1 in front of the current position of the own vehicle M1. On the basis of the map information, for example, the drive assist apparatus 1 may detect the DDI present in front of the own vehicle M1 in advance (i.e., before the own vehicle M1 reaches the position illustrated in FIG. 2).

Even if the drive assist apparatus 1 fails to preliminarily detect the DDI present in front of the own vehicle M1 on the basis of the map information (e.g., even if no information on the DDI is included in the acquired map information despite the fact that the DDI is actually present on a region of the traveling route in front of the own vehicle M1), the drive assist apparatus 1 according to the example embodiment may detect the presence of the DDI in front of the own vehicle M1 on the basis of the surrounding condition information acquired by the camera unit 21, for example.

When the own vehicle M1 traveling along the traveling route R1 as described above reaches the first intersection CR1 and stops immediately before the stop line C2 provided before the first intersection CR1 as illustrated in FIGS. 3 and 4, the DDI detector 24 of the drive assist apparatus 1 in the own vehicle M1 may determine whether a condition specific to an environment around the entrance is satisfied (e.g., whether a predetermined traffic light, a predetermined road sign, or a predetermined road mark is present) on the basis of front condition image information acquired by the camera unit 21 or the like. On the basis of the determination about the condition, the DDI detector 24 may detect whether the own vehicle M1 is entering the predetermined region RL of the DDI, and at the same time, determine whether the first intersection CR1 corresponds to an entrance of the predetermined region RL of the DDI.

The DDI detector 24 may first detect a traffic light (not illustrated in FIGS. 3 and 4) installed at an intersection present in front of the own vehicle M1 (e.g., the first intersection CR1 in the example illustrate in FIGS. 3 and 4), and detect whether a predetermined traveling direction regulation sign is provided beside the traffic light and whether a road mark regarding a traveling direction is provided. If the road sign provided beside the traffic light and the road mark are detected, the DDI detector 24 may detect the types of the road sign and the road mark. For example, the DDI detector 24 may detect the traveling direction regulation sign provided beside the traffic light to be a road sign that prohibits traveling in directions other than the straight direction (e.g., the STRAIGHT ONLY road sign A1 illustrated in FIG. 2), a road sign that allows vehicles to advance only in a predetermined (e.g., straight) traveling direction (e.g., the straight-arrow road mark C1 illustrated in FIG. 2 that allows vehicles to travel only in a predetermined traveling direction (e.g., the straight direction)), or a traffic light indicating a straight arrow (or a diagonal-up left arrow) at a green light portion (e.g., the traffic light B1 illustrated in FIG. 2). In this way, the DDI detector 24 may detect that the first intersection CR1 and the traffic light present in front of the own vehicle M1 satisfy the conditions regarding the form of the intersection at the entrance of the DDI. At the same time, the DDI detector 24 may detect road signs provided in the vicinity of the first intersection CR1. For example, when detecting both of a KEEP LEFT (left-hand) road sign (e.g., the KEEP LEFT road sign D1 illustrated in FIG. 2) and a no entry road sign (e.g., the DO NOT ENTER road sign E1 illustrated in FIG. 2) in right front of the own vehicle M1, the DDI detector 24 may determine the first intersection CR1 to be an entrance of the predetermined region RL of the DDI.

Optionally, the DDI detector 24 may determine the first intersection CR1 to be an entrance of the predetermined region RL of the DDI when detecting elements described below. This further enhances the accuracy of the results of the detection of the DDI.

For example, in a case where a curve connected to the first intersection CR1 is detected in at least one of a region immediately before the intersection (e.g., the first intersection CR1 in this example) recognized in front of the own vehicle M1 or a region immediately behind the intersection recognized in front of the own vehicle M1 and where intense illumination light emitted from the headlights of oncoming vehicles is detected in a region on the right side of the keep left road sign (a region HL1 surrounded by a dot line in FIG. 4) having been detected in right front of the own vehicle M1 in the night time, the DDI detector 24 may determine the first intersection CR1 to be an entrance of the predetermined region RL of the DDI. The drive assist apparatus 1 may determine that the own vehicle M1 is entering the predetermined region RL of the DDI on the basis of the result of the determination.

In a case where the DDI detector 24 determines the first intersection CR1 recognized in front of the own vehicle M1 to be an entrance of the predetermined region RL of the DDI and where the own vehicle M1 is detected to enter the predetermined region of the DDI through the first intersection CR1, the drive assist apparatus 1 switches various settings for the traveling control from the settings conforming to right-hand traffic to the settings conforming to left-hand traffic. For example, the drive assist apparatus 1 may switch the setting on the oncoming-vehicle emerging expected region in which the control process for detecting an oncoming vehicle is conducted from a left region setting conforming to right-hand traffic to a right region setting conforming to left-hand traffic. Additionally, in accordance with the switch of the setting on the oncoming-vehicle emerging expected region, the drive assist apparatus 1 makes a switch to the control in consideration of the oncoming vehicle.

Thereafter, the drive assist apparatus 1 may cause the oncoming vehicle detector 23 to execute the process for detecting an oncoming vehicle, the light distribution control, and the like.

In the example illustrated in FIGS. 3 and 4, the DDI detection process, the oncoming vehicle detection process, and the light distribution control may be executed while the own vehicle M1 is stopping before the first intersection CR1 at the red light (i.e., while other vehicles on the oncoming lane are traveling). However, this example is non-limiting. Even in a case where the own vehicle M1 traveling on the own-vehicle lane P1 of the general road P reaches the first intersection CR1 and enters the predetermined region RL of the DDI through the first intersection CR1 without stopping before the traffic light installed at the first intersection CR1 (when the traffic light indicates a green light for the own-vehicle lane) (i.e., while the vehicles on the oncoming lane are stopping at a red light), the DDI detection process, the oncoming vehicle detection process, and the light distribution control may be executed while the own vehicle is traveling.

Another traveling route that allows the own vehicle M1 to enter the predetermined region RL of the DDI may be provided in addition to the traveling route R1 passing through the first intersection CR1 installed on the entrance (see FIGS. 2 to 4). As described above, the other traveling route may branch from the lane H1 of the highway H, pass through a substantially one-way branch passage (e.g., the traveling routes R4 and R4A illustrated in FIGS. 2 to 4), and merge into the own-vehicle lane P1 (left-hand traffic region) of the general road P with the predetermined region RL of the DDI. The traveling rote R4A may also serve as an entrance of the predetermined region RL of the DDI.

The own vehicle M1 entering the DDI through the entrance of the traveling route R4A may perform a series of movements described below. For example, the own vehicle M1 traveling on the lane H1 of the highway H may enter the branch passage along the traveling route R4 while decelerating, and enter the traveling route R4A that branches from the traveling route R4. The traveling route R4A set on the branch passage may have a leftward curve immediately before the region merging into the own-vehicle lane P1 (left-hand traffic region) within the predetermined region RL of the DDI. In the vicinity of the region merging into the own-vehicle lane P1 within the predetermined region RL, a left arrow road sign, i.e., a ONE WAY road sign (not illustrated), and a YIELD road sign (not illustrated) may be installed in right front when viewed from the vehicle traveling on the own-vehicle lane P1. Accordingly, the vehicle traveling along the traveling route R4A that branches from the traveling route R4 may advance at a slow speed or stop temporarily in the vicinity of the region merging into the own-vehicle lane P1 (left-hand traffic region) before turning left to merge into the own-vehicle lane P1. When turning left, the vehicle may turn on a left-turn signal lamp.

As described above, the own-vehicle lane P1 may be a left-hand traffic general road region within the predetermined region RL of the DDI. The drive assist apparatus 1 may thus detect whether the own vehicle M1 is entering the predetermined region RL of the DDI also when the own vehicle M1 enters the DDI through the traveling route R4A or the entrance.

Also in this case, the DDI may be detected on the basis of the map information in advance (before the own vehicle reaches the point where the traveling route R4A merges into the own-vehicle lane P1). The DDI detector 24 may detect whether the own vehicle M1 is entering the predetermined region RL of the DDI on the basis of the front condition image information acquired by the camera unit 21 or the like, and at the same time, determine whether the first intersection CR1 corresponds to an entrance of the predetermined region RL of the DDI.

In this case, the DDI may be detected on the conditions where the vehicle speed of the own vehicle M1 is detected to be changed (decelerated) from a vehicle speed within a predetermined speed range determined on the basis of a highway speed limit to a vehicle speed within a predetermined speed range determined on the basis of a general road speed limit, where a leftward curve is detected on the road (or the branch passage) on which the own vehicle M1 is traveling on the basis of the image captured by the camera or the detection value detected by the yaw rate sensor or the steering sensor, where road signs such as the ONE WAY road sign with and up-left arrow and the YIELD road sign are recognized in right front of the own vehicle, and where the left-turn light signal lamp is detected to be turned on. In a case where all the conditions are satisfied, the own vehicle traveling along the traveling route R4 branching from the highway H and the traveling route R4A may be determined to enter the own-vehicle lane P1 (left-hand traffic region) of the general road P within the predetermined region RL of the DDI.

When the own vehicle M1 is detected to enter the predetermined region RL of the DDI, the control switch 25 switches various settings for the traveling control from the settings conforming to right-hand traffic to the settings conforming to left-hand traffic. For example, the control switch 25 may switch the setting on the oncoming-vehicle emerging expected region in which the control process for detecting an oncoming vehicle is conducted from a left region setting conforming to right-hand traffic to a right region setting conforming to left-hand traffic. Additionally, in accordance with the switch of the setting on the oncoming-vehicle emerging expected region, the control switch 25 makes a switch to the light distribution control in consideration of the oncoming vehicle. The operations performed by the drive assist apparatus 1 according to the example embodiment when the own vehicle enters the predetermined region RL of the DDI has been described above.

The operation performed by the drive assist apparatus 1 according to the example embodiment when the own vehicle exits from the predetermined region RL of the DDI will now be described in further detail with reference to some examples.

Figure 5:
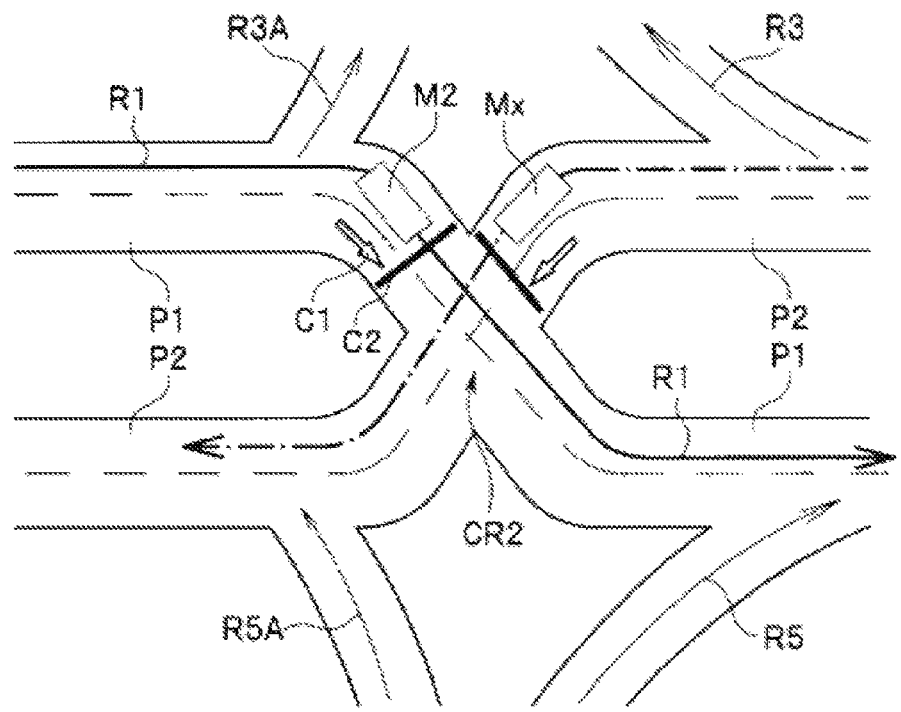
FIG. 5 is a conceptual diagram illustrating an exemplary situation where the own vehicle including the drive assist apparatus according to one example embodiment of the technology is exiting from the DDI region.
Figure 6:
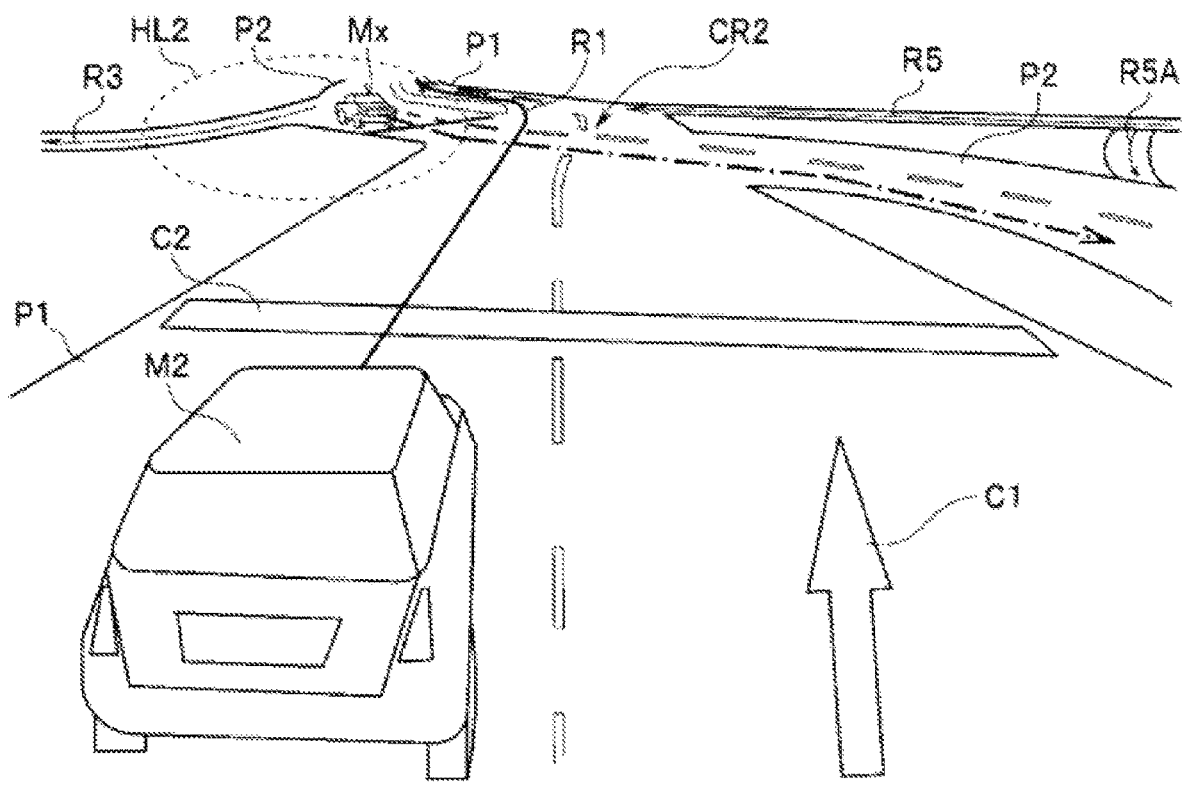
FIG. 6 is a conceptual diagram illustrating the situation illustrated in FIG. 5 viewed from above and behind the own vehicle.

FIGS. 5 and 6 are conceptual diagrams illustrating an exemplary surrounding conditions observed when the own vehicle M2 including the drive assist apparatus according to the example embodiment is detected to be traveling on the own-vehicle lane P1 (on the left side) within the predetermined region RL of the DDI and exiting from the predetermined region RL of the DDI. FIG. 4 is a plan view of a region in the vicinity of the second intersection CR2 of the DDI illustrated in FIG. 2. FIG. 6 is a conceptual diagram illustrating the region illustrated in FIG. 5 viewed from above and behind the own vehicle M2. Note that the traffic lights and road signs illustrated in FIG. 2 except some of them (e.g., the straight-arrow road mark C1 and the stop line C2) are not illustrated so as not to complicate the drawings in FIGS. 5 and 6, as in FIGS. 3 and 4.

When the traffic light installed at the first intersection CR1 turns on a green light, the own vehicle M1 in the conditions illustrated in FIGS. 3 and 4 may restart traveling along the traveling route R1 set on the own-vehicle lane P1 to enter the predetermined region RL of the DDI through the first intersection CR1. After entering the predetermined region RL of the DDI, the own vehicle may travel on the own-vehicle lane P1 (left-hand traffic region). The own vehicle traveling within the predetermined region RL may be indicated by a reference numeral M2 (see FIGS. 2, 5, and 6). While the own vehicle M2 is traveling, the drive assist apparatus 1 included in the own vehicle M2 may acquire the surrounding condition information and the map information and execute the general traveling control referring to the information. The own vehicle M2 may be then brought into conditions illustrated in FIGS. 5 and 6.

In the conditions illustrated in FIGS. 5 and 6, the own vehicle M2 traveling on the own-vehicle lane P1 (left-hand traffic region) within the predetermined region RL of the DDI may stop immediately before the stop line C2 provided on the road surface before the second intersection CR2 at a red signal indication of the traffic light (not illustrated in FIGS. 5 and 6) installed at the second intersection CR2. In this case, the second intersection CR2 may be an exit of the predetermined region RL of the DDI for the own vehicle M2.

In these conditions, the DDI detector 24 of the drive assist apparatus 1 in the own vehicle M2 may determine whether a condition specific to an environment around the exit of the DDI is satisfied (e.g., whether a predetermined traffic light, a predetermined road sign, or a predetermined road mark is present) on the basis of the front image information acquired by the camera unit 21 or the like. On the basis of the determination about the condition, the DDI detector 24 may detect whether the own vehicle M2 is exiting from the predetermined region RL of the DDI, and at the same time, determine whether the second intersection CR2 corresponds to an exit of the predetermined region RL of the DDI.

The DDI detector 24 may first detect a traffic light (not illustrated in FIGS. 5 and 6) installed at an intersection present in front of the own vehicle M2 (e.g., the second intersection CR2 in the example illustrated in FIGS. 5 and 6), and detect whether a predetermined traveling direction regulation sign is provided beside the traffic light and whether a road mark regarding a traveling direction is provided. If the road sign provided beside the traffic light and road mark are detected, the DDI detector 24 may detect the types of the road sign and the road mark. For example, the DDI detector 24 may detect the traveling direction regulation sign provided beside the traffic light to be a road sign that prohibits traveling in directions other than the straight direction (e.g., the STRAIGHT ONLY road sign A1 illustrated in FIG. 2), a road sign allowing vehicle to advance only in a predetermined (e.g., straight) traveling direction (e.g., the straight-arrow road mark C1 illustrated in FIG. 2 that allows vehicles to travel only in a predetermined traveling direction (e.g., the straight direction)), or a traffic light indicating a straight arrow (or a diagonal-up left arrow) at a green light portion (e.g., the traffic light B1 illustrated in FIG. 2). In this way, the DDI detector 24 may detect whether the second intersection CR2 and the traffic light present in front of the own vehicle M2 satisfy the conditions regarding the form of the intersection at the exit of the DDI. At the same time, the DDI detector 24 may detect road signs provided in the vicinity of the second intersection CR2. For example, when detecting both of a KEEP RIGHT (right-hand) road sign (e.g., the KEEP RIGHT road sign D2 illustrated in FIG. 2) and a no entry road sign (e.g., the DO NOT ENTER road sign E1 illustrated in FIG. 2) in left front of the own vehicle M2, the DDI detector 24 may determine the second intersection CR2 to be an exit of the predetermined region RL of the DDI.

Optionally, the DDI detector 24 may determine the second intersection CR2 to be an exit of the predetermined region RL of the DDI when detecting determination elements described below. This further enhances the accuracy of the results of the detection of the DDI.

For example, in a case where a curve connected to the second intersection CR2 is detected in at least one of a region immediately before the intersection (e.g., the second intersection CR2 in this example) recognized in front of the own vehicle M2 or a region immediately behind the intersection recognized in front of the own vehicle M2 and where intense illumination light emitted from the headlights of oncoming vehicles is detected in a region on the left side of the keep right road sign (a region HL2 surrounded by a dot line in FIG. 6) having been detected in left front of the own vehicle M2 in the night time, the DDI detector 24 may determine the second intersection CR2 to be an exit of the predetermined region RL of the DDI. The drive assist apparatus 1 may determine that the own vehicle M2 is entering the predetermined region RL of the DDI on the basis of the result of the determination.

In a case where the DDI detector 24 determines the second intersection CR2 recognized in front of the own vehicle M2 to be an exit of the predetermined region RL of the DDI and where the own vehicle M2 is detected to exit from the predetermined region RL of the DDI through the second intersection CR2, the drive assist apparatus 1 switches various settings for the traveling control from the settings conforming to left-hand traffic to the settings conforming to right-hand traffic. For example, the drive assist apparatus 1 may switch the setting on the oncoming-vehicle emerging expected region in which the control process for detecting an oncoming vehicle is conducted from the right region setting conforming to left-hand traffic to the left region setting conforming to right-hand traffic. Additionally, in accordance with the switch of the setting on the oncoming-vehicle emerging expected region, the drive assist apparatus 1 makes a switch to the light distribution control in consideration of the oncoming vehicle.

Thereafter, the drive assist apparatus 1 may cause the oncoming vehicle detector 23 to execute the process for detecting an oncoming vehicle, the light distribution control, and the like.

In the example illustrated in FIGS. 5 and 6, the DDI detection process, the oncoming vehicle detection process, and the light distribution control may be executed while the own vehicle M2 is stopping before the second intersection CR2 at the red light (i.e., while vehicles on the oncoming lane are traveling). However, this example is non-limiting. Even in a case where the own vehicle M2 reaches the second intersection CR2 and exits from the predetermined region RL of the DDI through the second intersection CR2 without stopping before the traffic light installed at the second intersection CR2 (when the traffic light indicates a green light for the own-vehicle lane) (i.e., while the vehicles on the oncoming lane are stopping at a red light), the DDI detection process, the oncoming vehicle detection process, and the light distribution control may be executed while the own vehicle is traveling.

Another traveling route that allows the own vehicle M2 to exit from the predetermined region RL of the DDI may be provided in addition to the traveling route R1 passing through the second intersection CR2 installed on the exit (see FIGS. 2, 5, and 6). The other traveling route may branch from a part of the own-vehicle lane P1 (left-hand traffic region) within the predetermined region RL, pass through a substantially one-way branch passage (e.g., the traveling route R3A and R3 illustrated in FIGS. 2, 5, and 6), and merge into the lane H2 of the highway H. The traveling route R3A may also serve as an exit of the predetermined region RL of the DDI. While traveling on the own-vehicle lane P1 within the predetermined region RL of the DDI, the drive assist apparatus 1 may also detect whether the own vehicle M2 is exiting from the predetermined region RL.

The own vehicle M2 exiting from the DDI through the exit of the traveling route R3A may perform a series of movements described below. For example, the own vehicle M2 traveling straight on the own-vehicle lane P1 (left-hand traffic region) within the predetermined region RL of the DDI may enter the branch passage along the traveling route R3A while decelerating, and travel on the traveling route R3 that branches from the traveling route R3A while accelerating. The branch passage on which the traveling route R3A is set may have a leftward curve having a predetermined radius of curvature or greater as illustrated in FIG. 2. The traveling route R3A may merge into the traveling route R3, and the traveling route R3 may eventually merge into the lane H2 of the highway H. While traveling on the traveling route, the own vehicle M2 may turn on the left turn signal lamp immediately before entering the traveling route R3A branching from the own-vehicle lane P1 and immediately before merging into the lane H2 of the highway H from the traveling route R3.

Accordingly, the drive assist apparatus 1 may determine that the own vehicle M2 is exiting from the DDI through the traveling route R3A or the exit in a case where the own vehicle M2 traveling on the own-vehicle lane P1 (left-hand traffic region) within the predetermined region RL of the DDI is detected to turn on the left-turn signal lamp and where a curve having a predetermined radius of curvature or greater is detected in left front of the own vehicle M2 through the image recognition of the front condition image captured by the camera unit 21. Thereafter, the drive assist apparatus 1 may determine that own vehicle M2 has exited from the predetermined region RL of the DDI through the traveling route R3A or the exit and merged from the traveling route R3 into the highway H in a case where a predetermined turning yaw rate or greater or a steering operation at a predetermined steering angle or greater has been continuously detected for a given period of time or longer, where the left-turn signal lamp is detected to be turned on, and where the vehicle speed of the own vehicle is detected to be changed from a vehicle speed within a predetermined speed range in accordance with a general road speed limit to a vehicle speed within a predetermined vehicle speed range in accordance with a highway speed limit.

Note that one reason for detecting the turning yaw rate and the steering angle for a given period of time or longer is to prevent the vehicle performing a general lane change operation from being wrongly detected as the vehicle exiting from the DDI.

Further, the drive assist apparatus 1 may recognize obstacles, such as roadside walls, trees planted along the side strips, guard rails or other structures extending in a horizontal direction, in the environment in front of the own vehicle on the basis of the front condition image captured by the camera unit 21. This further ensures the recognition of the own vehicle exiting from the predetermined region RL of the DDI. When the own vehicle exiting or having exited from the predetermined region RL of the DDI is detected in this way, the control switch 25 switches various settings for the traveling control from the settings conforming to right-hand traffic to the settings conforming to left-hand traffic.

For example, the control switch 25 may switch the setting on the oncoming-vehicle emerging expected region in which the control process for detecting an oncoming vehicle is conducted from the right region setting conforming to left-hand traffic to the left region setting conforming to right-hand traffic. Additionally, in accordance with the switch of the setting on the oncoming-vehicle emerging expected region, the control switch 25 makes a switch to the light distribution control in consideration of the oncoming vehicle. The operation performed by the drive assist apparatus 1 according to the example embodiment when the own vehicle exits from the predetermined region RL of the DDI has been described above.

Next, the flows of exemplary processes executed by the drive assist apparatus 1 according to the example embodiment when the own vehicle including the drive assist apparatus 1 enters the predetermined region RL of the DDI, when the own vehicle exits from the predetermined region RL, and when the own vehicle travels within the predetermined region RL are described with reference to the flowcharts illustrated in FIGS. 7 to 9.

Figure 7:
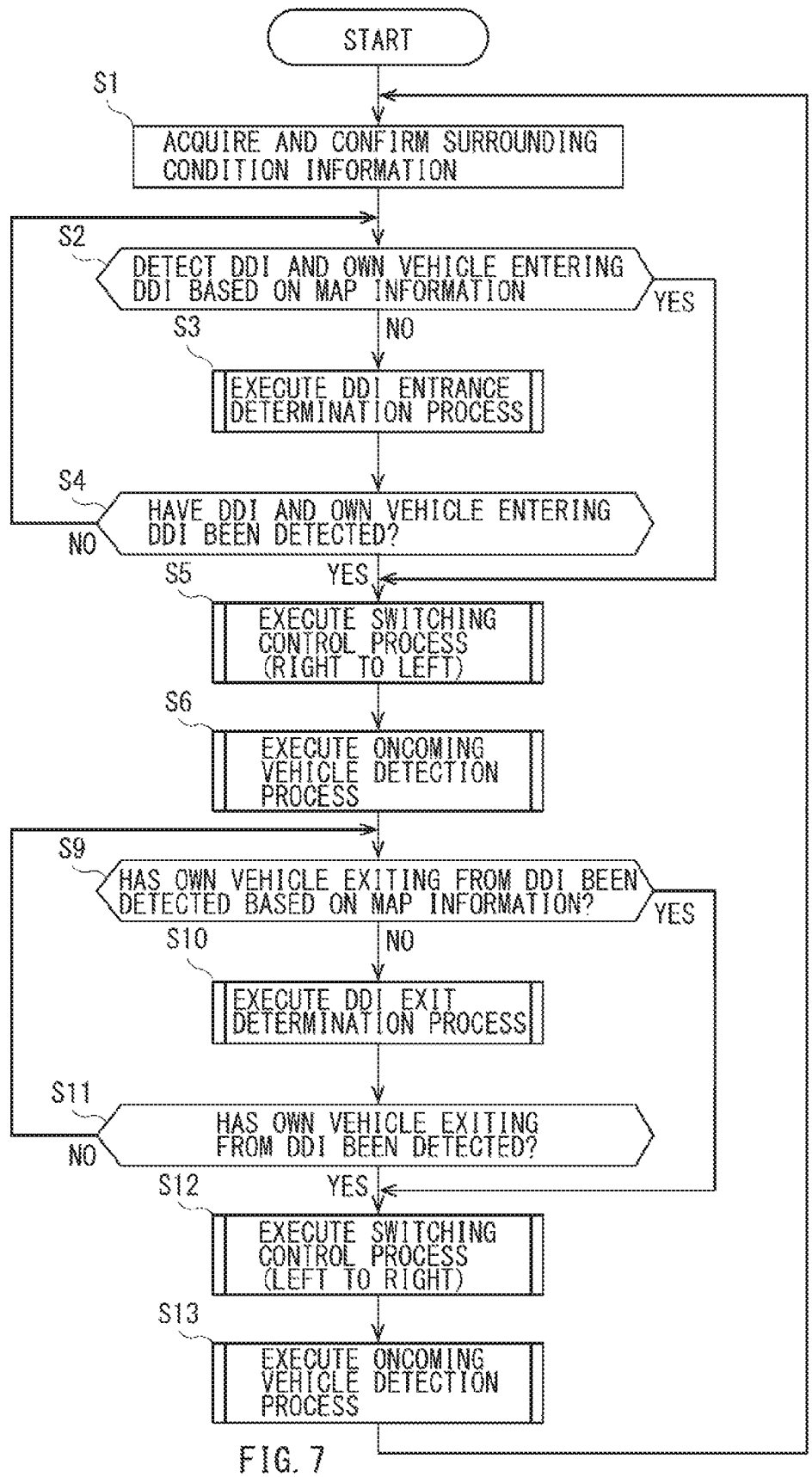
FIG. 7 is a flowchart schematically illustrating exemplary operations performed by the drive assist apparatus according to one example embodiment of the technology when the own vehicle enters the DDI, travels in the DDI region, and exits from the DDI.

FIG. 7 is a flowchart schematically illustrating the operation performed by the drive assist apparatus 1 according to the example embodiment when the own vehicle enters the DDI, travels within the DDI, and exits from the DDI. FIG. 8 is a flowchart illustrating a sub-routine of Step S3 (a DDI entrance determination process) in FIG. 7. FIG. 9 is a flowchart illustrating a sub-routine illustrating Step S10 (a DDI exit determination process) in FIG. 7. FIG. 10 is a flowchart illustrating Steps S6 and S13 (an oncoming vehicle detection process) in FIG. 7.

In this example, the own vehicle M1 including the drive assist apparatus 1 may be supposed to travel on the own-vehicle lane P1 of the general road P (see FIG. 2) after being driven.

While the own vehicle M1 is traveling on the own-vehicle lane P1, the traveling control processor 26 in the drive assist apparatus 1 may continuously acquire and confirm the surrounding condition information in Step S1 in FIG. 7.

In Step S2, the DDI detector 24 in the traveling control processor 26 of the drive assist apparatus 1 (hereinafter simply referred to as the drive assist apparatus 1) may determine whether the DDI is present in the region of the traveling route R1 in front of the own vehicle M1 on the basis of some pieces of the various information acquired in Step S1, such as the map information and the information on the position of the own vehicle. At the same time, if the presence of the DDI is confirmed in the region of the traveling route R1 in front of the own vehicle, the drive assist apparatus 1 may determine whether the own vehicle M1 is entering the DDI on the basis of the map information, the information on the position of the own vehicle, and the like.

In a case where the DDI is detected in the region of the traveling route R1 in front of the own vehicle on the basis of the map information, the information on the position of the own vehicle, and the like, and where the own vehicle is detected to enter the DDI (Step S2: YES), the process may proceed to Step S5. In contrast, no DDI is detected in the region of the traveling route R1 in front of the own vehicle on the basis of the map information, the information on the position of the own vehicle, and the like (Step S2: NO), the process may proceed to Step S3.

Although the presence of the DDI may be detected on the basis of the map information and the like in Step S2, it may be sometimes difficult to detect the presence of the DDI in front of the own vehicle only by the detection based on the map information or the like, as described above. In such a case, the presence of the DDI in front of the own vehicle M1 may be detected on the basis of the surrounding condition information or the like acquired by the camera unit 21 and the surrounding condition monitoring unit 22 in Step S3 described below. Step S2 may thus be omitted in this case.

In Step S3, the drive assist apparatus 1 may perform a DDI entrance determination process on the basis of the surrounding condition information or the like. The DDI entrance determination process will now be described in detail with reference to FIG. 8.

Figure 8:
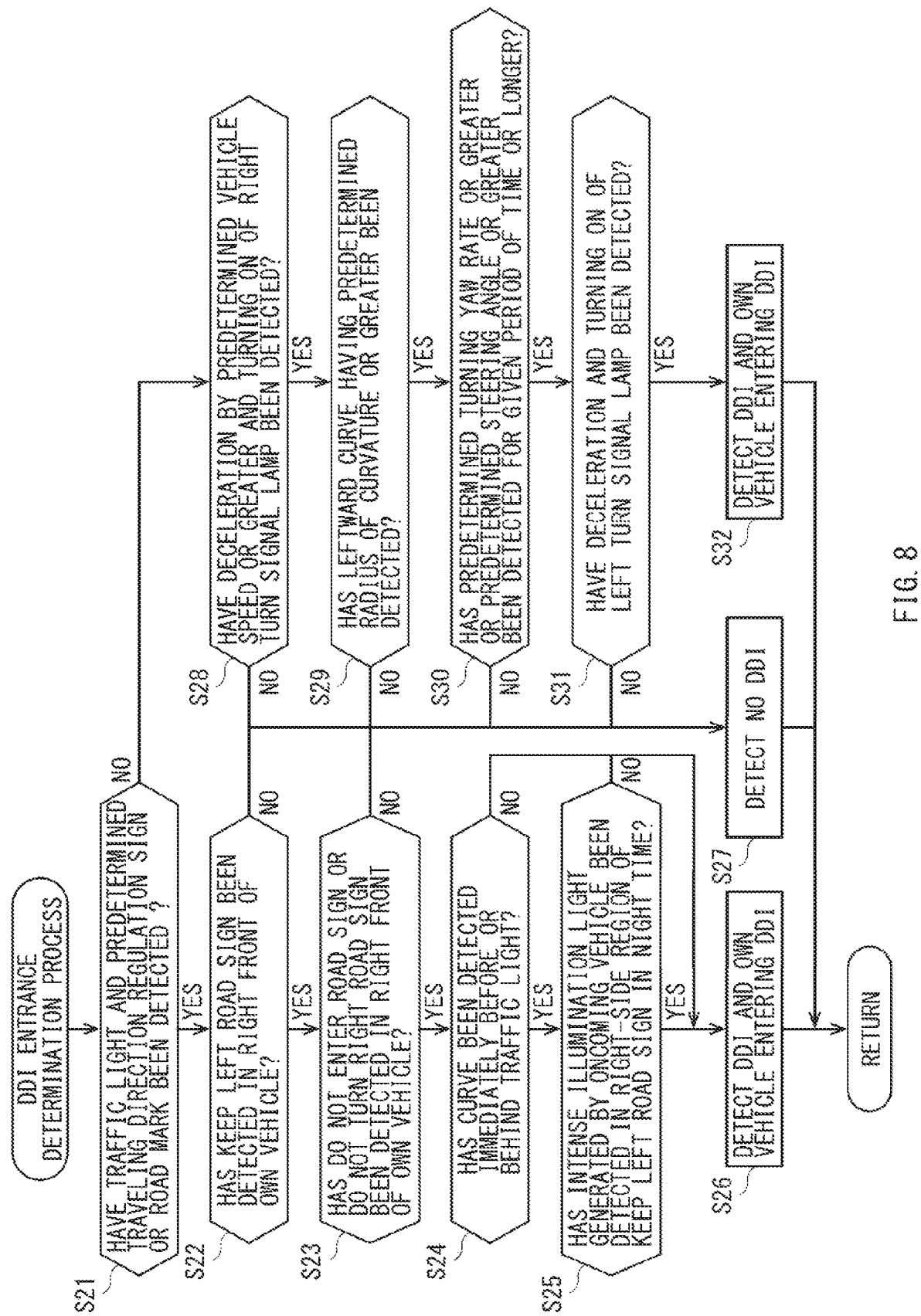
FIG. 8 is a flowchart illustrating an exemplary sub-routine for a DDI entrance determination process in Step S3 of the flowchart illustrated in FIG. 7.

In Steps S21 to S25 of the DDI entrance determination process illustrated in FIG. 8, the own vehicle M1 may be supposed to enter the predetermined region RL of the DDI through the first intersection CR1 illustrated in FIG. 2, for example (see the traveling route R1). Additionally, in Steps S28 to S31 in FIG. 8, the own vehicle M1 traveling on the main lane of the highway may be supposed to pass through a branch passage to enter the predetermined region RL of the DDI, for example (see the traveling routes R4A and R5A).

First, in Step S21 in FIG. 8, the drive assist apparatus 1 may determine whether a predetermined traffic light and a predetermined traveling direction regulation sign or a predetermined road mark (e.g., those denoted by the reference numerals A1, B1, and C1 in FIG. 2) have been detected in front of the own vehicle M1 on the basis of the surrounding condition information and the like. If the predetermined traffic light and the predetermined traveling direction regulation sign or the predetermined road mark have been detected in front of the own vehicle M1 (Step S21: YES), the process may proceed to Step S22. If neither the predetermined traffic light, the predetermined traveling direction regulation sign, nor the predetermined road mark has not been detected in front of the own vehicle M1 (Step S21: NO), the process may proceed to Step S28.

In Step S22, the drive assist apparatus 1 may determine whether a KEEP LEFT (left-hand traffic) road sign D1 illustrated in FIG. 2 has been detected in right front of the own vehicle M1. If the KEEP LEFT road sign D1 has been detected in right front of the own vehicle M1 (Step S22: YES), the process may proceed to Step S23. If the KEEP LEFT road sign D1 has not been detected (Step S22: NO), the process may proceed to Step S27.

In Step S23, the drive assist apparatus 1 may determine whether the DO NOT ENTER road sign E1 illustrated in FIG. 2 or the DO NOT TURN RIGHT road sign F1 illustrated in FIG. 2 has been detected in right front of the own vehicle M1. If the DO NOT ENTER road sign E1 or the DO NOT TURN RIGHT road sign F1 has been detected in right front of the own vehicle M1 (Step S23: YES), the process may proceed to Step S24. If neither the DO NOT ENTER road sign E1 nor the DO NOT TURN RIGHT road sign F1 has been detected in right front of the own vehicle M1 (Step S23: NO), the process may proceed to Step S27.

In Step S24, the drive assist apparatus 1 may determine whether a curve connected to the first intersection CR1 has been detected in at least one of a region immediately before the first intersection CR1 detected in front of the own vehicle M1 or a region immediately behind the first intersection CR1 detected in front of the own vehicle M1. If the curve has been detected in at least one of the region immediately before the first intersection CR1 or the region immediately behind the first intersection CR1 (Step S24: YES), the process may proceed to Step S25. If the curve has not been detected in at least one of the region immediately before the first intersection CR1 or the region immediately behind the first intersection CR1 (Step S24: NO), the process may proceed to Step S26.

In Step S25, the drive assist apparatus 1 may determine whether it is nighttime and whether intense illumination light generated by the headlight of an oncoming vehicle has been detected in a right-side region of the KEEP LEFT road sign detected in Step S22 in the front condition image captured by the camera. If the illumination light has been detected in nighttime (Step S25: YES), the process may proceed to Step S26. Even if it is not nighttime and if the illumination light has not been detected (Step S25: NO), the process may proceed to Step S26.

In Step S26, the drive assist apparatus 1 may determine that the DDI is detected to be present in front of the own vehicle M1 and that the own vehicle M1 is entering the detected DDI.

That is, if the traveling direction regulation sign and the road mark (e.g., those denoted by the reference numerals A1, B1, and C1), the KEEP LEFT road sign D1, and the DO NOT ENTER road sign E1 or the DO NOT TURN RIGHT road sign F1 have been all detected at least in Steps S21, S22, and S23 in the DDI entrance determination process performed in Steps S21 to S25, the drive assist apparatus 1 may determine that the first intersection CR1 is an entrance of the predetermined region RL of the DDI (Step S26). Thereafter, the process may return to the main routine illustrated in FIG. 7 (RETURN).

Steps S24 and S25 may be performed to enhance the accuracy of the DDI entrance determination process. Thus, Steps S24 and S25 are not necessarily essential steps for the DDI entrance determination process. In particular, Step S25 may be a step for detecting the distribution of illumination light emitted from the headlight of an oncoming vehicle detected in front of the own vehicle. This step may be needed only while the own vehicle is traveling in nighttime (e.g., while the headlight is turned on). For these reasons, even if the result of the detection in Step S25 is "NO", the process may proceed to Step S26 in the DDI entrance determination process.

If these elements have not been detected in Steps S22 and S23, the process may proceed to Step S27. In Step S27, the drive assist apparatus 1 may determine that the presence of the DDI has not been detected (i.e., make a DDI non-detection determination). Thereafter, the process may return to the main routine illustrated in FIG. 7 (RETURN).

If neither the predetermined traffic light, the predetermined traffic regulation sign, nor the predetermined road mark has been detected in front of the own vehicle in Step S21 (Step S21: NO), the process may proceed to Step S28. In Step S28, the drive assist apparatus 1 may determine whether the vehicle speed of the own vehicle M1 has been decelerated by a predetermined vehicle speed or greater and whether the right turn signal lamp has been turned on. In this example, the deceleration by the predetermined vehicle speed or greater and the turning on of the right turn signal lamp may be performed when the own vehicle M1 enters the branch passage (e.g., the traveling route R4 in FIG. 2) branching from the main lane of the highway to the interchange.

In this case, if the deceleration by the predetermined vehicle speed or greater and the turning on of the right turn signal lamp have been detected (Step S28: YES), the process may proceed to Step S29. In contrast, if neither the deceleration by the predetermined vehicle speed or greater nor the turning on of the right turn signal lamp has been detected (Step S28: NO), the process may proceed to Step S27.

In Step S29, the drive assist apparatus 1 may determine whether a leftward curve having a predetermined radius of curvature or greater is present on the left side of the own vehicle. The leftward curve having the predetermined radius of curvature or greater may be the traveling route R4A branching from the traveling route R4, for example.

In this case, if the leftward curve having the predetermined radius of curvature or greater has been detected (Step S29: YES), the process may proceed to Step S30. In contrast, if the leftward curve having the predetermined radius of curvature or greater has not been detected (Step S29: NO), the process may proceed to Step S27.

In Step S30, the drive assist apparatus 1 may determine whether a predetermined turning yaw rate or greater or a predetermined steering angle or greater has been continuously detected for a given period of time or longer. Through the determination, it may be determined whether the own vehicle is traveling on the leftward curve having the predetermined radius of curvature or greater (e.g., the traveling route R4A).

In this case, if the predetermined turning yaw rate or greater or the predetermined steering angle or greater has been continuously detected for the given period of time or longer (Step S30: YES), the drive assist apparatus 1 may determine that the own vehicle is traveling on the leftward curve having the predetermined radius of curvature or greater (e.g., the traveling route R4A), and the process may proceed to Step S31. Otherwise (Step S30: NO), the process may proceed to Step S27.

In Step S31, the drive assist apparatus 1 may determine whether the vehicle speed is decelerating and whether the left turn signal lamp has been turned on. In this example, the deceleration of the vehicle speed and the turning on of the left turn signal lamp may be performed when the own vehicle decelerates before entering the own-vehicle lane P1 (on the left side) within the predetermined region RL of the DDI from the traveling route R4A and turns to left to merge into the own-vehicle lane P1.

In this case, if the deceleration and the turning on of the left turn signal lamp have been detected (Step S31: YES), the process may proceed to Step S32. In contrast, if the deceleration and the turning on of the left turn signal lamp have not been detected (Step S31: NO), the process may proceed to Step S27.

In Step S32, the drive assist apparatus 1 may detect that the DDI is detected to be present in front of the own vehicle and that the own vehicle is entering the detected DDI.

That is, even if neither the predetermined traffic light, the predetermined traffic regulation sign, nor the predetermined road mark has been detected in front of the own vehicle in Step S21 (Step S21: NO), the drive assist apparatus 1 may determine that the own vehicle is entering the predetermined region RL of the DDI from a traveling route without passing through the first intersection CR1 in a case where the surrounding elements concerned have been all detected in Steps S28 to S31 (Step S32). Thereafter, the process may return to the main routine illustrated in FIG. 7 (RETURN).

If the surrounding elements concerned have not been detected through Steps S28 to S31, the process may proceed to Step S27. In Step S27, the drive assist apparatus 1 may determine that the presence of the DDI has not been detected (i.e., make the DDI non-detection determination), as in the case where the process proceeds from either of Steps S22 and S23 to Step S27. Thereafter, the process may return to the main routine illustrated in FIG. 7 (RETURN).

When the process returns to Step S4 in FIG. 7, the drive assist apparatus 1 may refer to the result of determination (the DDI entrance determination process in FIG. 8) made in Step S3 described above. If the result of the determination indicates that the DDI has been detected in front of the own vehicle and that own vehicle is entering the DDI (in Step S26 or S32 in FIG. 8), the process may proceed to Step S5. If the result of the determination indicates that the DDI has not been detected in front of the own vehicle (i.e., the DDI non-detection determination is made) (in Step S27 in FIG. 8), the process may return to Step S2.

In Step S5, the control switch 25 of the traveling control processor 26 in the drive assist apparatus 1 may perform a switching control process for switching various settings for the traveling control. In the switching control process executed at this time, the setting conforming to right-hand traffic may be switched to the setting conforming to left-hand traffic. For example, the setting on the oncoming-vehicle emerging expected region in which the control process for detecting an oncoming vehicle is conducted may be switched from the left region setting conforming to right-hand traffic to the right region setting conforming to left-hand traffic. Additionally, in accordance with the switch of the setting on the oncoming-vehicle emerging expected region, the control switch 25 makes a switch to the light distribution control in consideration of the oncoming vehicle.

In Step S6, the drive assist apparatus 1 may execute an oncoming vehicle detection process or the like. The oncoming vehicle detection process executed at this time may be based on the setting condition set in Step S5. Note that the oncoming vehicle detection process executed at this time may be the same as a typical surrounding environment recognizing process, and the detailed description of the oncoming vehicle detection process is omitted herein. The process may then proceed to Step S9.

In Step S9, the drive assist apparatus 1 (in specific, the DDI detector 24) may determine whether the own vehicle M2 is exiting from the predetermined region RL of the DDI on the basis of the various information acquired, such as the map information and the information on the position of the own vehicle.

If the own vehicle M2 is detected to be exiting from the predetermined region RL of the DDI on the basis of the map information, the information on the position of the own vehicle, and the like (Step S9: YES), the process may proceed to Step S12. In contrast, if the own vehicle M2 is not detected to be exiting from the predetermined region RL of the DDI on the basis of the map information, the information on the position of the own vehicle, and the like (Step S9: NO), the process may proceed to Step S10.

Although it is determined whether the own vehicle M2 is exiting from the DDI on the basis of the map information or the like in Step S9, it may be sometimes difficult to detect whether the own vehicle M2 is exiting from the DDI only by the detection based on the map information or the like. In such a case, the state of the own vehicle M2 exiting from the DDI may be detected on the basis of the surrounding condition information or the like acquired by the camera unit 21, the surrounding condition monitoring unit 22, and the like. Step S9 may thus be omitted in this case.

In Step S10, the drive assist apparatus 1 (in specific, the DDI detector 24) may perform DDI exit determination process on the basis of the surrounding condition information or the like. The DDI exit determination process will now be described in detail with reference to FIG. 9.

Figure 9:
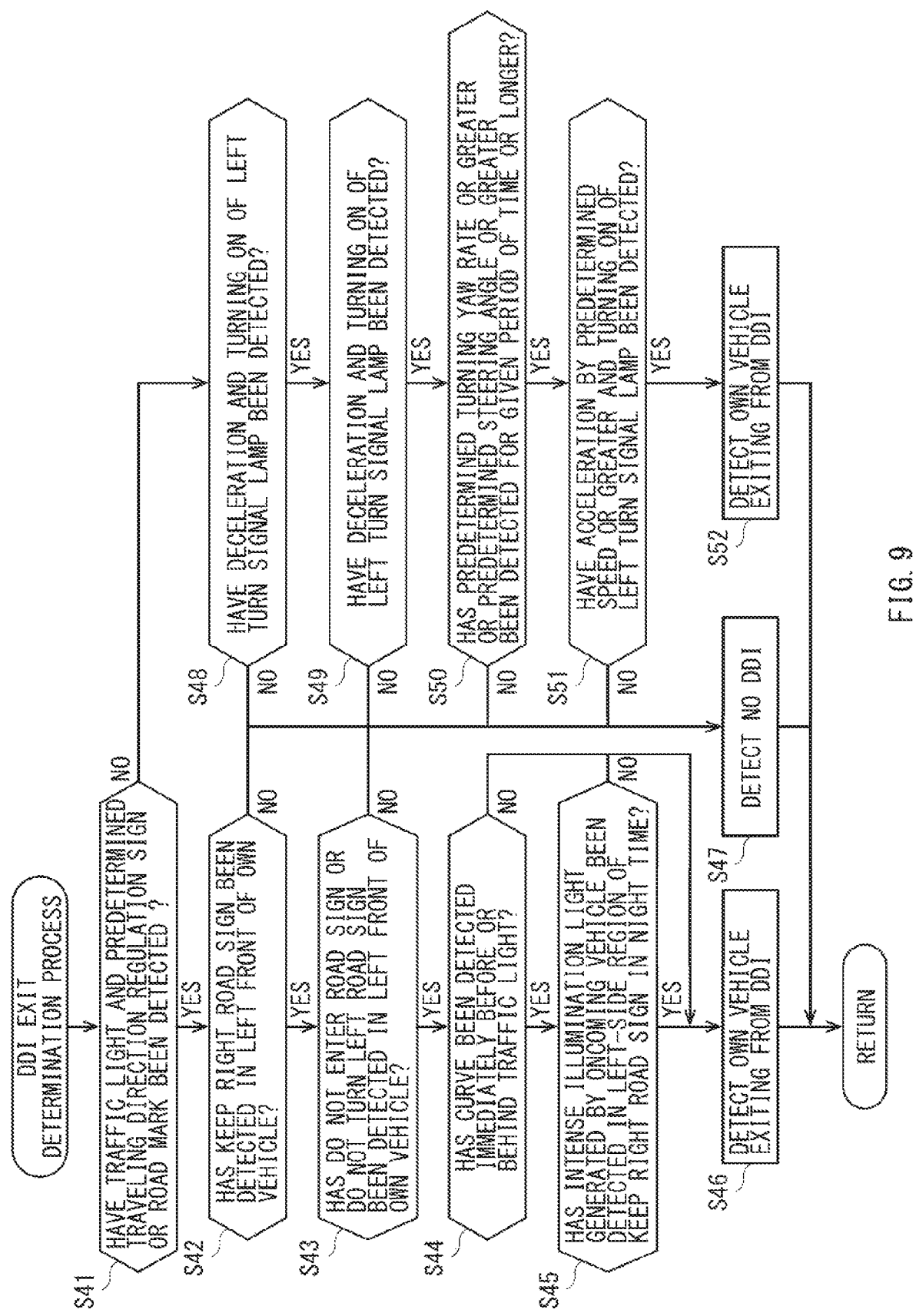
FIG. 9 is a flowchart illustrating an exemplary sub-routine for a DDI exit determination process in Step S10 of the flowchart illustrated in FIG. 7.

In Steps S41 to S45 in the DDI exit determination process illustrated in FIG. 9, the own vehicle M2 may be supposed to exit from the predetermined region RL of the DDI through the second intersection CR2 illustrated in FIG. 2, for example (see the traveling route R1). Additionally, in Steps S48 to S51 in FIG. 9, the own vehicle M2 traveling on the general road P within the predetermined region RL of the DDI may be supposed to pass through a branch passage toward the main lane of the highway, for example (see the traveling routes R3A and R2A).

First, in Step S41 in FIG. 9, the drive assist apparatus 1 may determine whether a predetermined traffic light and a predetermined traveling direction regulation sign or a predetermined road mark (e.g., those denoted by the reference numeral A1, B1, and C1 in FIG. 2) have been detected in front of the own vehicle M2 on the basis of the surrounding condition information and the like. If the predetermined traffic light and the predetermined traveling direction regulation sign or the predetermined road mark have been detected in the region in front of the own vehicle M2 (Step S41: YES), the process may proceed to Step S42. If neither the predetermined traffic light, the predetermined traveling direction regulation sign, nor the predetermined road mark has not been detected in front of the own vehicle M2 (Step S41: NO), the process may proceed to Step S48.

In Step S42, the drive assist apparatus 1 may determine whether a KEEP RIGHT (right-hand traffic) road sign D2 illustrated in FIG. 2 has been detected in left front of the own vehicle M2. If the KEEP RIGHT road sign D2 has been detected in left front of the own vehicle M2 (Step S42: YES), the process may proceed to Step S43. If the KEEP RIGHT road sign D2 has not been detected (Step S42: NO), the process may proceed to Step S47.

In Step S43, the drive assist apparatus 1 may determine whether the DO NOT ENTER road sign E1 illustrated in FIG. 2 or the DO NOT TURN LEFT road sign F2 illustrated in FIG. 2 has been detected in left front of the own vehicle M2. If the DO NOT ENTER road sign E1 or the DO NOT TURN LEFT road sign F2 has been detected in left front of the own vehicle M1 (Step S43: YES), the process may proceed to Step S44. If neither the DO NOT ENTER road sign E1 nor the DO NOT TURN LEFT road sign F2 has been not detected in left front of the own vehicle M2 (Step S43: NO), the process may proceed to Step S47.

In Step S44, the drive assist apparatus 1 may determine whether a curve connected to the second intersection CR2 has been detected in at least one of a region immediately before the second intersection CR2 detected in front of the own vehicle M2 or a region immediately behind the second intersection CR2 detected in front of the own vehicle M2. If the curve has been detected in at least one of the region immediately before the second intersection CR2 or the region immediately behind the second intersection CR2 (Step S44: YES), the process may proceed to Step S45. If the curve has not been detected in at least one of the region immediately before the second intersection CR2 or the region immediately behind the second intersection CR2 (Step S44: NO), the process may proceed to Step S46.

In Step S45, the drive assist apparatus 1 may determine whether it is nighttime and whether intense illumination light generated by the headlight of an oncoming vehicle has been detected in a right-side region of the KEEP RIGHT road sign detected in Step S42 in the front condition image captured by the camera. If the illumination light has been detected in nighttime (Step S45: YES), the process may proceed to Step S46. Even if it is not nighttime and if the illumination light has not been detected (Step S45: NO), the process may proceed to Step S46.

In Step S46, the drive assist apparatus 1 may determine that the own vehicle M2 is exiting from the predetermined region RL of the DDI. That is, if the traveling direction regulation sign and the road mark (e.g., those denoted by the reference numerals A1, B1, and C1), the KEEP RIGHT road sign D2, and the DO NOT ENTER road sign E1 or the DO NOT TURN LEFT road sign F2 have been all detected at least in Steps S41, S42, and S43 in the DDI exit determination process performed in Steps S41 to S45, the drive assist apparatus 1 may determine that the second intersection CR2 is an exit of the predetermined region RL of the DDI (Step S46). Thereafter, the process may return to the main routine illustrated in FIG. 7 (RETURN).

Steps S44 and S45 may be optional steps for enhancing the accuracy of the DDI exit determination process. Thus, Steps S44 and S45 are not necessarily essential steps for the DDI exit determination process. Step S45 may be a step for detecting the distribution of illumination light emitted from the headlight of an oncoming vehicle recognized in front of the own vehicle. This step may be needed only while the own vehicle is traveling in nighttime (e.g., while the headlight is turned on). For these reasons, even if the result of the detection in Step S45 is "NO", the process may proceed to Step S46 in the DDI exit determination process.

If these elements have not been detected in Steps S42 and S43, the process may proceed to Step S47. In Step S47, the drive assist apparatus 1 may determine that the presence of the DDI has not been detected (i.e., make a DDI non-detection determination). Thereafter, the process may return to the main routine illustrated in FIG. 7 (RETURN).

If neither the predetermined traffic light, the predetermined traffic regulation sign, nor the predetermined road mark have been detected in front of the own vehicle in Step S41 (Step S41: NO), the process may proceed to Step S48. In Step S48, the drive assist apparatus 1 may determine whether the vehicle speed of the own vehicle M2 has been decelerated and whether the left turn signal lump has been turned on. In this example, the deceleration operation and the turning on of the left turn signal lamp may be performed when the own vehicle M2 enters the branch passage (e.g., the traveling route R3A in FIG. 2) branching from the general road P within the predetermined region RL of the DDI to the highway.

In this case, if the deceleration and the turning on of the left turn signal lamp have been detected (Step S48: YES), the process may proceed to Step S49. If neither the deceleration nor the turning on of the left turn signal lamp has been detected (Step S48: NO), the process may proceed to Step S47.

In Step S49, the drive assist apparatus 1 may determine whether a leftward curve having a predetermined radius of curvature or greater is present on the left side of the own vehicle. The leftward curve having the predetermined radius of curvature or greater may be the traveling routes R3A and R2A branching from the respective exits of the predetermined region RL of the DDI, for example.

In this case, if the leftward curve having the predetermined radius of curvature or greater has been detected (Step S49: YES), the process may proceed to Step S50. In contrast, if the leftward curve having the predetermined radius of curvature or greater has not been detected (Step S49: NO), the process may proceed to Step S47.

In Step S50, the drive assist apparatus 1 may determine whether a predetermined turning yaw rate or greater or a predetermined steering angle or greater has been continuously detected for a given period of time or longer. Through the determination, it may be determined whether the own vehicle is traveling on the leftward curve having the predetermined radius of curvature or greater (e.g., the traveling routes R3A and R2A).

In this case, if the predetermined turning yaw rate or greater or the predetermined steering angle or greater has been continuously detected for the given period of time or longer (Step S50: YES), the drive assist apparatus 1 may determine that the own vehicle is traveling on the leftward curve having the predetermined radius of curvature or greater (e.g., the traveling routes R3A and R2A), and the process may proceed to Step S51. Otherwise (Step S50: NO), the process may proceed to Step S47.

In Step S51, the drive assist apparatus 1 may determine whether the vehicle speed is accelerating and whether the left turn signal lamp has been turned on. In this example, the acceleration of the vehicle speed and the turning on of the left turn signal lamp may be performed when the own vehicle merges into the main lane of the highway from the traveling route R3A and the traveling route R3.

In this case, if the acceleration and the turning on of the left turn signal lamp have been detected (Step S51: YES), the process may proceed to Step S52. In contrast, if the acceleration and the turning on of the left turn signal lamp have not been detected (Step S51: NO), the process may proceed to Step S47.

In Step S52, the drive assist apparatus 1 may determine that the own vehicle is exiting (or has exited) from the DDI.

That is, even if neither the predetermined traffic light, the predetermined traffic regulation sign, nor the predetermined road mark has been detected in front of the own vehicle in Step S41 (Step S41: NO), the drive assist apparatus 1 may determine that the own vehicle is exiting (has exited) from the predetermined region RL of the DDI through a traveling route without passing through the second intersection CR2 in a case where the surrounding elements concerned have been all detected in Steps S48 to S51 (Step S52). Thereafter, the process may return to the main routine illustrated in FIG. 7 (RETURN).

If the surrounding elements concerned have not been detected through Steps S48 to S51, the process may proceed to Step S47. In Step S47, the drive assist apparatus 1 may determine that the own vehicle is not exiting from the DDI (i.e., make DDI exit non-detection determination), as in the case where the process proceeds from either of Steps S42 and S43 to Step S47. Thereafter, the process may return to the main routine illustrated in FIG. 7 (RETURN).

When the process returns to Step S11 in FIG. 7, the drive assist apparatus 1 may refer to the result of determination (the DDI exit determination process in FIG. 9) made in Step S10 described above. If the result of the determination indicates that the own vehicle is exiting (or has exited) from the DDI (in Step S46 or S52 in FIG. 9), the process may proceed to Step S12. If the result of the determination indicates that the own vehicle is not exiting from the DDI (i.e., the DDI exit non-detection determination is made) (in Step S47 in FIG. 9), the process may return to Step S9.

In Step S12, the control switch 25 of the traveling control processor 26 in the drive assist apparatus 1 may perform a switching control process for switching various settings for the traveling control. In the switching control process executed at this time, the setting conforming to left-hand traffic may be switched to the setting conforming to right-hand traffic. For example, the setting on the oncoming-vehicle emerging expected region in which the control process for detecting an oncoming vehicle is conducted may be switched from the right region setting conforming to left-hand traffic to the left region setting conforming to right-hand traffic. Additionally, in accordance with the switch of the setting on the oncoming-vehicle emerging expected region, the control switch 25 makes a switch to the light distribution control in consideration of the oncoming vehicle.

In Step S13, the drive assist apparatus 1 may execute the oncoming vehicle detection process or the like. The oncoming vehicle detection process executed at this time may be based on the setting condition set in Step S12. The process sequence of the oncoming vehicle detection process performed when the own vehicle exits from the DDI will now be described in detail with reference to FIG. 10. Note that the oncoming detection process executed at this time may be the same as a typical surrounding environment recognizing process, and the detailed description of the oncoming vehicle detection process is omitted herein. The series of steps may be thereby completed, and the process may return to Step S1.

As described above, the drive assist apparatus according to the foregoing example embodiment includes: a surrounding-condition-information acquiring unit (21, 22, or 12) configured to recognize a surrounding condition around a vehicle to acquire surrounding condition information; a vehicle-state-information acquiring unit (15) configured to recognize an operational state of the vehicle to acquire vehicle state information; a light-distribution control processor (35) configured to execute light distribution control to control the distribution of illumination light to the region in front of the vehicle by controlling the illumination device of the vehicle; a traveling control processor (26) configured to execute traveling control of the vehicle in accordance with traffic lane designation; a DDI detector (24) configured to detect a diverging diamond interchange (DDI) in a region in front of the vehicle on the basis of the surrounding condition information and make a DDI determination as to whether the vehicle is entering the DDI or exiting from the DDI on the surrounding condition information and the vehicle state information; and a control switch (25) configured to switch the traveling control executed by the traveling control processor on the basis of the result of the DDI determination made by the DDI detector (24). The control switch (25) is configured to switch the traveling control executed by the traveling control processor (26) and the light distribution control executed by the light-distribution control processor (35) from standard traveling control to non-standard traveling control when the vehicle entering the DDI is detected as the result of the DDI determination made by the DDI detector (24). The control switch (25) is configured to switch the traveling control executed by the traveling control processor (26) and the light distribution control executed by the light-distribution control processor (35) from the non-standard traveling control to the standard traveling control when the vehicle exiting from the DDI is detected as the result of the DDI determination made by the DDI detector (24).

The drive assist apparatus 1 having such a configuration more accurately detects whether the vehicle is entering or exiting from the region in which the relative positional relationship is reversed in the lateral direction between the own-vehicle lane on which the own vehicle is traveling and the oncoming-vehicle lane on which the oncoming vehicle is traveling while the own vehicle is traveling on the road infrastructure having an irregular structure such as the diverging diamond interchange (DDI). The drive assist apparatus 1 may appropriately switches the traveling control depending on whether the vehicle is detected to be entering the DDI or detected to be exiting from the DDI. This allows for more safety and secure traveling control in accordance with traffic regulations.

Further, the drive assist apparatus 1 according to the foregoing example embodiment makes it possible to execute the light distribution control on the basis of the traffic lane designation even after the switch of the traffic lane designation. For example, the drive assist apparatus 1 reduces malfunctions caused when the HBA system and the ADB system are activated. This enables always safe traveling control and contributes to an improvement in safety.

One or more of the light-distribution control processor 35, the traveling control processor 26, the DDI detector 24, and the control switch 25 in the drive assist apparatus 1 in FIG. 1 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the light-distribution control processor 35, the traveling control processor 26, the DDI detector 24, and the control switch 25. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the light-distribution control processor 35, the traveling control processor 26, the DDI detector 24, and the control switch 25 in the drive assist apparatus 1 in FIG. 1.

The technology should not be limited to the foregoing example embodiments, and various modifications and application examples may be made without departing from the scope of the gist of the technology. Further, the foregoing example embodiments each include various stages of the technology, and various technologies may be extracted by appropriately combining the features of the technology disclosed herein. For example, in a case where the above-described concerns may be addressed and the above-described effects may be obtained even if some features are deleted from all the features disclosed herein, the remaining features may be extracted as a technology. Further, features of difference example embodiments may be appropriately combined. The technology should not be limited by any particular example embodiment other than as limited by the appended claims.

The invention claimed is:

1. A vehicle drive assist apparatus to be applied to a vehicle, the vehicle drive assist apparatus comprising:
   a surrounding-condition-information acquiring unit comprising at least one of a sensor or a camera configured to recognize a surrounding condition around the vehicle to acquire surrounding condition information;
   a vehicle-state-information acquiring unit comprising an autonomous traveling sensor assembly configured to recognize an operational state of the vehicle to acquire vehicle state information;
   a light-distribution control processor configured to execute light distribution control to control distribution of illumination light to a region in front of the vehicle by controlling an illumination device of the vehicle;
   a traveling control processor configured to execute traveling control of the vehicle in accordance with traffic lane designation;
   an oncoming vehicle detector configured to:
      determine whether the surrounding-condition-information acquiring unit detects a mobile object moving in front of the vehicle toward the vehicle;
      in response to determining that the surrounding-condition-information acquiring unit detects the mobile object, determine a position of the mobile object with respect to the vehicle as viewed in a width direction of the vehicle; and
      in response to the determined position of the mobile object, determine whether the mobile object is an oncoming vehicle, the oncoming vehicle is positioned in left front of the vehicle when the vehicle is in a right-hand basis control, or in right front of the vehicle when the vehicle is in a left-hand basis control,
   a DDI detector comprising a circuitry configured to detect a diverging diamond interchange (DDI) in the region in front of the vehicle on a basis of the surrounding condition information and make a DDI determination as to whether the vehicle is entering the DDI or exiting from the DDI on a basis of the determination of the oncoming vehicle detector and the vehicle state information; and
   a control switch configured to switch the traveling control executed by the traveling control processor on a basis of a result of the DDI determination made by the DDI detector, wherein
   the control switch is configured to
      switch the traveling control executed by the traveling control processor and the light distribution control executed by the light-distribution control processor between the right-hand basis control and the left-hand basis control, in response to the vehicle entering the DDI being detected as the result of the DDI determination made by the DDI detector, and
      switch the traveling control executed by the traveling control processor and the light distribution control executed by the light-distribution control processor between a right-hand basis control and a left-hand basis control, in response to the vehicle exiting from the DDI being detected as the result of the DDI determination made by the DDI detector.

2. The vehicle drive assist apparatus according to claim 1, wherein
   the oncoming vehicle detector is configured to detect the oncoming vehicle approaching the vehicle by detecting illumination light of a headlight of the oncoming vehicle,
   the control switch is configured to switch an oncoming-vehicle emerging expected region in which the oncoming vehicle detector detects the oncoming vehicle while switching the traveling control and the light distribution control between the right-hand basis control and the left-hand basis control, and
   the light-distribution control processor is configured to execute the light distribution control on a basis of the oncoming-vehicle emerging expected region.

3. The vehicle drive assist apparatus according to claim 1, wherein the traveling control and the light distribution control are switched between the right-hand basis control and the left-hand basis control to accommodate to a reversed relative positional relationship in a lateral direction between an own-vehicle lane on which the vehicle is traveling and an oncoming-vehicle lane on which an oncoming vehicle is traveling in an opposite direction to the vehicle, in response to the vehicle entering the DDI being detected as the result of the DDI determination.

4. A vehicle drive assist apparatus to be applied to a vehicle, the vehicle drive assist apparatus comprising:
- a surrounding-condition-information sensor configured to recognize a surrounding condition around the vehicle to acquire surrounding condition information;
- a vehicle-state-information sensor configured to recognize an operational state of the vehicle to acquire vehicle state information; and
- circuitry configured to
  - execute light distribution control to control distribution of illumination light to a region in front of the vehicle by controlling an illumination device of the vehicle,
  - execute traveling control of the vehicle in accordance with traffic lane designation,
  - determine whether the surrounding-condition-information sensor detects a mobile object moving in front of the vehicle toward the vehicle,
  - in response to determining that the surrounding-condition-information sensor detects the mobile object, determine a position of the mobile object with respect to the vehicle as viewed in a width direction of the vehicle,
  - in response to the determined position of the mobile object, determine whether the mobile object is an oncoming vehicle, the oncoming vehicle is positioned in left front of the vehicle when the vehicle is in a right-hand basis control, or in right front of the vehicle when the vehicle is in a left-hand basis control,
  - detect a diverging diamond interchange (DDI) in the region in front of the vehicle on a basis of the surrounding condition information,
  - make a DDI determination as to whether the vehicle is entering the DDI or exiting from the DDI on a basis of the determination of the oncoming vehicle and the vehicle state information,
  - switch the traveling control on a basis of a result of the DDI determination,
  - switch the traveling control and the light distribution control between the right-hand basis control and the left-hand basis control, in response to the vehicle entering the DDI being detected as the result of the DDI determination, and
  - switch the traveling control and the light distribution control between a right-hand basis control and a left-hand basis control, in response to the vehicle exiting from the DDI being detected as the result of the DDI determination.

5. The vehicle drive assist apparatus according to claim 4, wherein the circuitry is configured to,
- detect the oncoming vehicle approaching the vehicle by detecting illumination light of a headlight of the oncoming vehicle,
- switch an oncoming-vehicle emerging expected region in which the oncoming vehicle is detected while switching the traveling control and the light distribution control between the right-hand basis control and the left-hand basis control, and
- execute the light distribution control on a basis of the oncoming-vehicle emerging expected region.

6. The vehicle drive assist apparatus according to claim 4, wherein the traveling control and the light distribution control are switched between the right-hand basis control and the left-hand basis control to accommodate to a reversed relative positional relationship in a lateral direction between an own-vehicle lane on which the vehicle is traveling and an oncoming-vehicle lane on which an oncoming vehicle is traveling in an opposite direction to the vehicle, in response to the vehicle entering the DDI being detected as the result of the DDI determination.

* * * * *